United States Patent

Murayama et al.

[11] Patent Number: 5,850,979
[45] Date of Patent: *Dec. 22, 1998

[54] FISHING REEL OF DOUBLE BEARING TYPE HAVING IMPROVED BALANCE AND ERGONOMIC PROPERTIES

[75] Inventors: Tomohiro Murayama; Nobuyuki Yamaguchi; Toshiro Ono, all of Tokyo; Shinichi Asano, Chiba, all of Japan

[73] Assignee: Daiwa Seiko, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 518,454

[22] Filed: Aug. 23, 1995

[30] Foreign Application Priority Data

| Aug. 23, 1994 | [JP] | Japan | 6-221171 |
| Oct. 3, 1994 | [JP] | Japan | 6-238984 |
| Oct. 5, 1994 | [JP] | Japan | 6-266289 |
| Mar. 31, 1995 | [JP] | Japan | 7-075671 |

[51] Int. Cl.⁶ .............................................. A01K 89/015
[52] U.S. Cl. ................................ 242/279; 242/261
[58] Field of Search .............................. 242/310, 277, 242/279, 280, 281, 261; D22/140, 141

[56] References Cited

U.S. PATENT DOCUMENTS

| D. 311,051 | 10/1990 | Peterson | D22/141 |
| 336,092 | 2/1886 | Crandal | 242/277 |
| D. 351,451 | 10/1994 | Storz | D22/140 |
| 401,049 | 4/1889 | Moller et al. | 242/281 |
| 1,438,007 | 12/1922 | Welch | 242/277 |
| 1,448,786 | 10/1923 | Breen . | |
| 1,507,404 | 9/1924 | Welch | 242/277 |
| 1,635,629 | 7/1927 | Marcy . | |
| 2,263,836 | 11/1941 | Balz et al. | 242/279 |
| 2,377,996 | 6/1945 | Coleman | 242/278 |
| 2,461,884 | 2/1949 | Elsinger | 242/278 |
| 2,478,111 | 8/1949 | Kilian | 242/279 |
| 2,609,161 | 9/1952 | Guhlin et al. | 242/277 |
| 2,610,809 | 9/1952 | Breedlove | 242/84.4 |
| 2,641,417 | 6/1953 | Kinsey | 242/84.4 |
| 2,641,418 | 6/1953 | Miller | 242/84.4 |
| 2,646,939 | 7/1953 | Hirsch | 242/84.5 |
| 3,612,437 | 10/1971 | Allebach | 242/268 |
| 4,345,726 | 8/1982 | Noda | 242/212 |
| 4,512,536 | 4/1985 | Sato | 242/261 |
| 4,775,113 | 10/1988 | Emura et al. | 242/279 |
| 4,779,819 | 10/1988 | Emura et al. | 242/279 |
| 5,330,130 | 7/1994 | Sakaguchi | 242/261 |
| 5,350,133 | 9/1994 | Morimoto | 242/261 |

FOREIGN PATENT DOCUMENTS

| 57-14605 | 3/1982 | Japan . |
| 57-22541 | 5/1982 | Japan . |
| 59-15896 | 5/1984 | Japan . |
| 1-44062 | 12/1989 | Japan . |
| 3-61873 | 6/1991 | Japan . |
| 496163 | 11/1938 | United Kingdom . |

*Primary Examiner*—Donald P. Walsh
*Assistant Examiner*—Emmanuel M. Marcelo
*Attorney, Agent, or Firm*—Sughrue, Mion, Zinn, Macpeak & Seas, PLLC

[57] ABSTRACT

A fishing reel of a double bearing type is provided in which the center of gravity of the reel and handle position are situated nearer to the position of the hand holding the reel to thereby be able to perform the fishline take-up operation of the handle stably. A fishing reel of an embodiment includes a reel main body (A) which includes two left and right side frames (1, 1'). A support plate (1") and a reel side plate (2) are mounted on the outside of the left side frame (1), while a reel side plate (3) is mounted on the outside of the right side frame (1'). A spool (11) is interposed between the left and right side frames (1, 1') and is fixed to a spool shaft (4). The spool (11) is structured such that it can be rotated by a handle (17). A handle shaft (6) is disposed in the rear of the spool shaft (4) on the opposite side to a fishline play-out direction. Between the left and right side frames (1, 1'), a level wind device (B) is disposed in front of the spool (11) on the fishline play-out direction side.

32 Claims, 27 Drawing Sheets

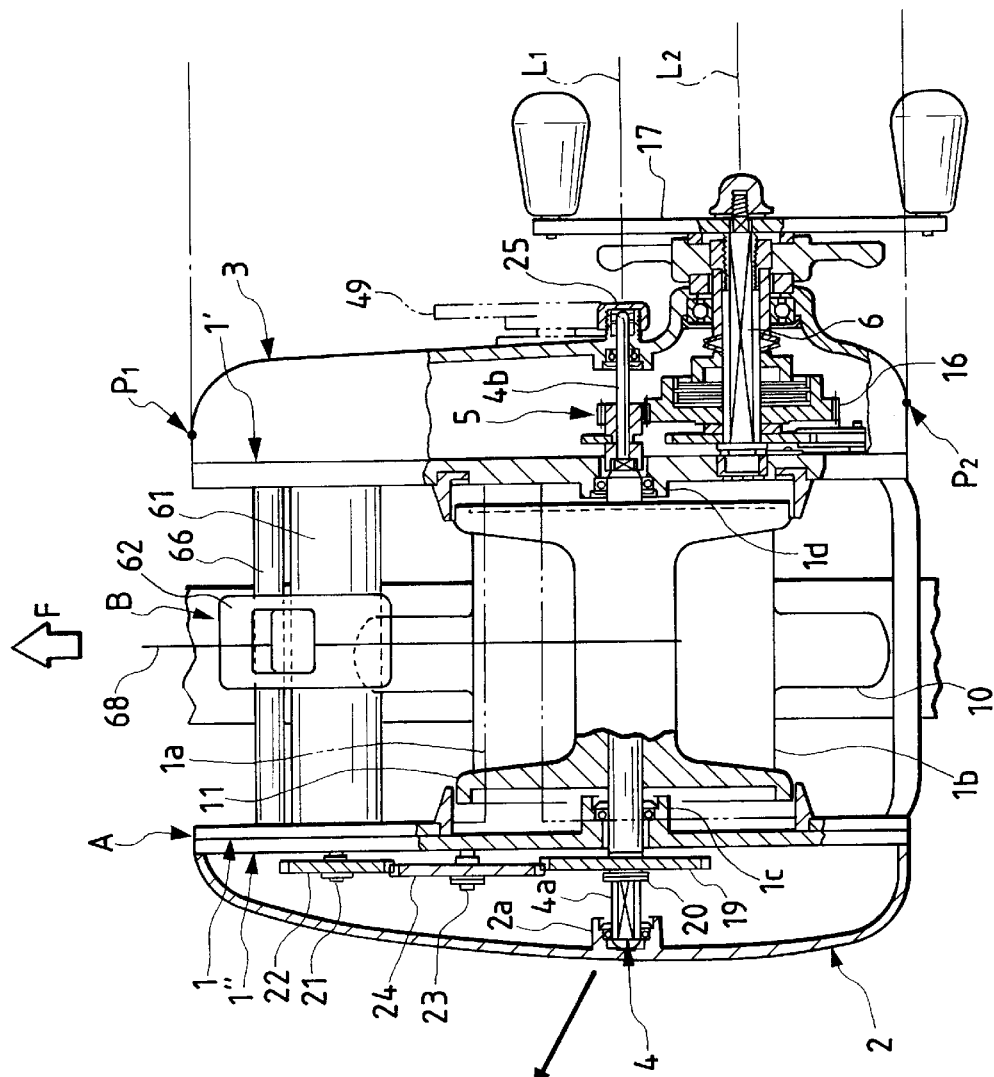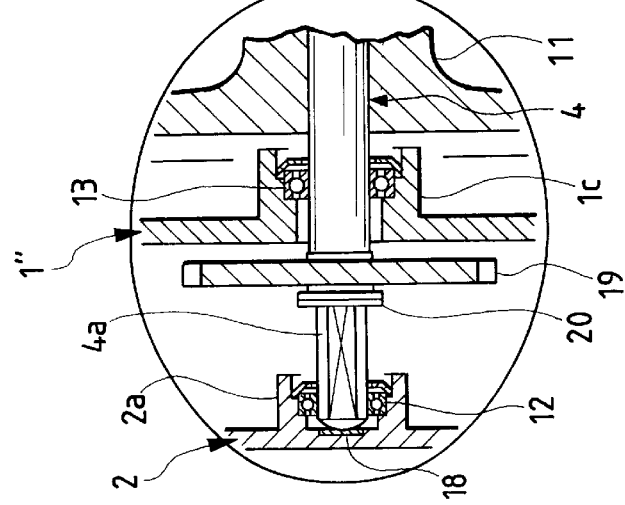

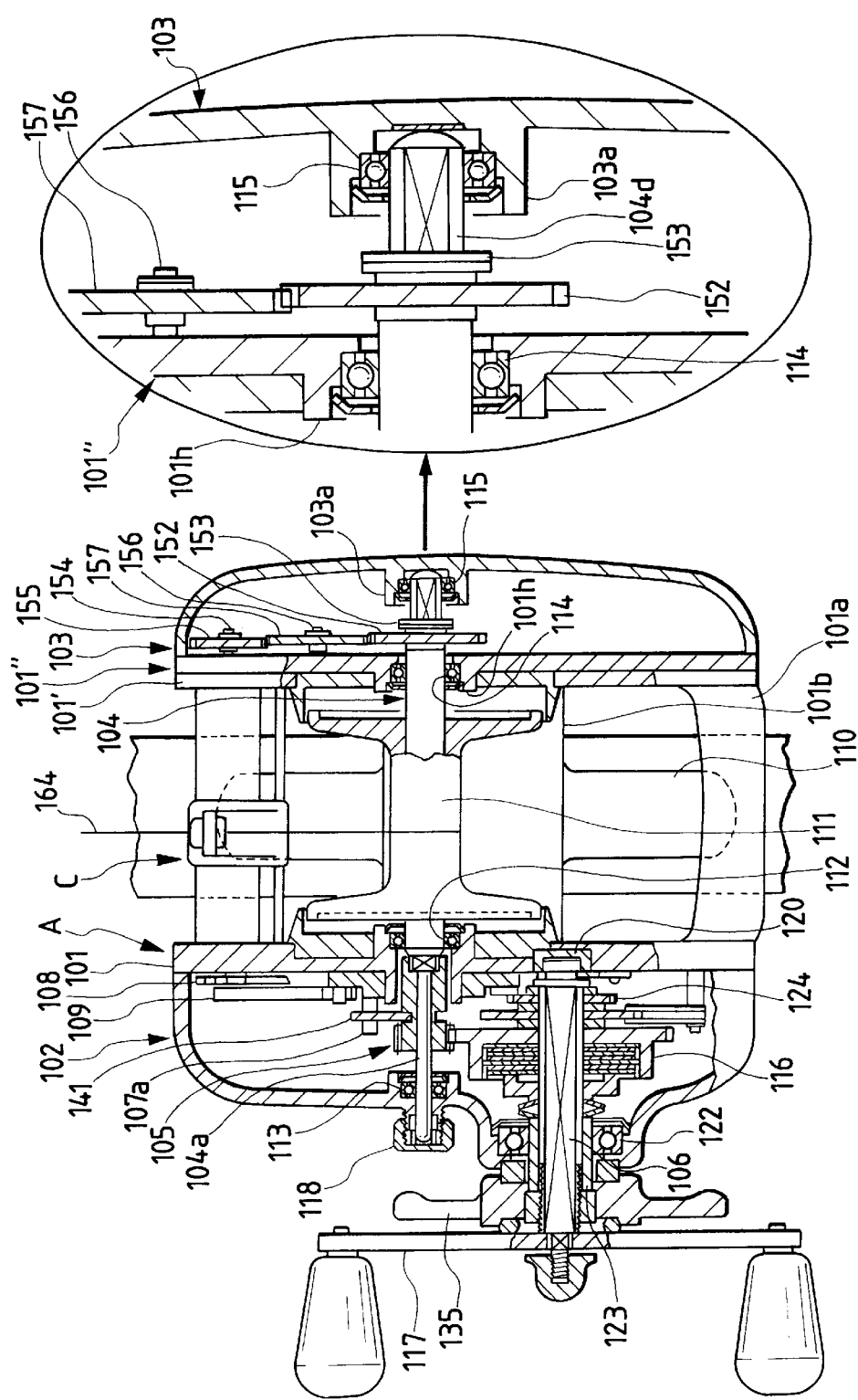

FISHING REEL OF DOUBLE BEARING TYPE HAVING IMPROVED BALANCE AND ERGONOMIC PROPERTIES

BACKGROUND OF THE INVENTION

The present invention relates to a fishing reel of a double bearing type which enables comfortable, smooth and natural operation by properly locating a handle, a clutch mechanism or the like.

Conventionally, a fishing reel of a double bearing type, as disclosed in Japanese Utility Model Kokoku Publication No. sho. 57-22541, is structured such that a spool supported rotatably between the two side plates of a reel main body is rotated for taking up a fishline by a handle. The handle is supported by one of the side plates and disposed at a location forwardly of the spool (that is, it is supported by a portion of the side plate on the fishline play-out direction side with respect to the spool).

However, in the above-mentioned conventional fishing reel of a double bearing type, since the handle for fishline take-up operation is mounted on the portion of the side plate that is situated forwardly of the spool shaft, there are still left the following problems to be solved:

That is, (1) since the position of the handle is remote from the body of an angler holding the reel by one hand while operating the handle by the other hand to take up a fishline, the arm of the angler is forcibly opened from the side of the angler's body, which makes it difficult to perform the stably fishline take-up operation of the handle;

(2) since an adjusting knob for pressure contact with the end portion of the spool shaft is disposed in the rear of the handle, the adjusting knob cannot be operated or rotated easily with the tip of the finger of one hand holding the reel; and, (3) in casting, if the reel is held in such a manner that the thumbing operation for the spool can be performed immediately, because the handle and drive gear are disposed in front of the spool shaft, the center of gravity of the reel lies in front of the position of the hand holding the reel. Due to this, the angler feels the reel heavy and thus is forced to hold the reel with a strong force, so that the reel is difficult to hold as well as the fishing rod and reel are difficult to swing.

In Japanese Utility Model Kokoku Publication No. Sho. 57-14605, Japanese Utility Model Kokoku Publication No. Sho. 59-15896 and the like, there is disclosed a fishing reel of a double bearing type including a clutch mechanism for switching a spool between a fishline take-up state and a fishline play-out state.

In either of the reels disclosed in the above publications '605 and '896, a handle shaft is disposed on the front side with respect to a spool shaft, and a switch-over element forming the clutch mechanism for switching the spool between the fishline take-up and play-out states is rotatably or slidably disposed on the side plate having the handle and located backwardly of the spool shaft.

When operating the handle, while the reel mounted on a fishing rod is being held by one hand in a thumbing operation allowable state, and the handle is held by the other hand.

In this case, however, if the reel is held by one hand in the thumbing operation allowable state, since the spool shaft is situated in the rear of the handle shaft, the reel cannot be operated in such a manner that the whole reel is held by one hand, and thus the reel cannot be held stably.

Also, in casting, when the switch-over element is operated to thereby switch the spool from the fishline take-up state over to the fishline play-out state, the other hand is detached from the handle in order to operate the switch-over element.

When fighting against a fish as well, since the switching operation of the switch-over element and the rotational operation of the handle are performed by the movement of the other hand, a series of operations cannot be performed continuously, quickly and easily.

In Japanese Utility Model Kokoku Publication No. Hei. 1-44062 and Japanese Utility Model Kokoku Publication No. Hei. 3-61873, there is disclosed a fishing reel including a typical fishline parallel winding device which is used to wind a fishline uniformly around a spool supported between the two side plates of a reel main body. The fishline parallel winding device disclosed in these publications includes a traverse shaft supported rotatably between the two side plates of a reel main body and including a traverse groove, a fishline guide member slidably supported on a support shaft arranged in parallel to the traverse shaft for guiding a fishline from the spool, and an engaging member provided in the fishline guide member and engageable with the traverse groove.

A gear meshable with a drive gear mounted on a handle shaft is mounted on the end portion of the traverse shaft and, if the handle shaft is rotated, then the traverse shaft is rotated. In response to the rotation of the traverse shaft, the fishline guide member reciprocates along the support shaft through the engaging member in engagement with the traverse groove to thereby wind the fishline uniformly around the spool.

However, in the above-mentioned conventional fishline parallel winding device, since the fishline parallel winding device including the fishline guide member, traverse shaft and the like as well as the handle shaft on which a reverse rotation preventive mechanism and a drag mechanism are mounted are disposed intensively between the two side plates at a location forwardly of the spool, there is required a large space in the front portion of the spool. Due to this, the reel main body and fishline winding device are increased in size as well as the reel is worsened in balance as a whole.

Further, when the fishline is wound around the spool, since the fishline containing therein a large amount of seawater, sand, dust and the like is guided to the spool through a guide hole formed in the fishline guide member, the seawater, sand, dust and the like are easy to adhere to the traverse shaft, the sliding portion of the fishline guide member and the like provided in the fishline parallel winding device. This raises several problems: that is, the fishline guide member cannot slide and reciprocate smoothly along the support shaft; the engagement between the traverse groove and engaging member is not stabilized; the fishline parallel winding device is inferior in durability and strength; the fishline guide member is easy to corrode so that it cannot reciprocate and slide; and the like.

SUMMARY OF THE INVENTION

The present invention aims at eliminating the drawbacks found in the conventional double bearing type fishing reels. Accordingly, it is an object of the invention to provide a fishing reel of a double bearing type in which the center of gravity of the reel and the position of the handle are located nearer to the position of the hand holding the reel, so that the handle can be stably operated for taking up a fishline, the adjusting knob for pressure contact with the end portion of the spool shaft can be operated or rotated easily, and the casting property of the reel can be improved.

Another object of the invention is to provide a fishing reel of a double bearing type in which a series of switching operations from the fishline play-out operation to the fishline take-up operation can be performed continuously, quickly and easily in such a manner that the switching operation of a switch-over element and the thumbing operation for the spool can be performed with the thumb of one hand holding the whole reel stably while a handle can be operated by the other hand.

Yet another object of the invention is to provide a fishline parallel winding device which, in use, prevents seawater, dust and the like from adhering to the sliding drive portion thereof during the fishline winding operation, allows the fishline guide member to reciprocate smoothly, and can improve the reel in balance as a whole.

In attaining the above object, according to the invention, there is provided a fishing reel of a double bearing type that a spool supported rotatably between the two side plates of a reel main body is rotated for taking up a fishline by a handle mounted on one of the side plates, in which the handle is rotatably mounted on the portion of the side plate of the reel main body that is situated in the rear of a spool shaft supporting the spool on the opposite direction side to a fishline play-out direction.

Since the handle is situated nearer to the body of the angler, the arm and the side of the angler's body can be closed tight when operating the handle, so that not only the fishline take-up operation of the handle can be performed smoothly and stably but also the unpleasant oscillation of the reel can be reduced.

Also, because the adjusting knob for pressure contact with the end portion of the spool shaft is also situated in front of the handle, the adjusting operation of the adjusting knob can be performed easily.

Further, as the handle used to perform a fishline take-up operation is mounted on the portion of the reel side plate that is situated in the rear of the spool shaft, the center of gravity of the reel and the mounting position of the handle lie nearer to the position of the hand holding the reel. Due to this, in casting, even if the reel is held under the thumbing operation allowable state for the spool, the reel is easy to hold as well as the fishing rod and reel are easy to swing.

In case the level wind device and handle shaft are arranged separately from each other, that is, the former is disposed in front of the spool shaft while the latter is disposed in the rear of the spool shaft, the drive portion can be mounted onto the reel main body in a well-balanced manner and thus the whole reel can be improved in balance.

Also, because the traverse cam shaft, handle shaft and spool shaft are not disposed collectively in the front portion of the reel main body with respect to the spool shaft, the reel can be improved in manufacture, assembly, dismantling and after-sales service.

The invention further provides a fishing reel of a double bearing type which comprises a clutch mechanism for switching a spool between a fishline take-up state and a fishline play-out state and the spool is rotated in the fishline take-up direction by a handle disposed on one of the side plates, in which, on the upper portion of the handle-mounted side plate at a location in the fishline play-out direction side and in front of a handle shaft, a switch-over element forming the clutch mechanism is shiftably provided at a position where not only the whole reel can be kept held in one hand but also the switch-over element can be operated with the thumb of the same hand for switching operation.

Preferably, the above-mentioned spool is rotatably supported through the spool shaft between the portions of the two side plates respectively situated forwardly of the handle shaft on the fishline play-out direction side.

According to the fishing reel of a double bearing type, (1) since a thumb operation portion formed in a switch-over element is disposed at a position where the tip of a thumb can be put thereon when the whole reel is held by one hand, the thumb operation portion can be operated or shifted with the whole reel held;

(2) because the thumb can be put on the flange outer periphery of a spool after the thumb operation portion is operated or shifted, there can be obtained a thumbing operation allowable state just after the reel is turned into its clutch-off state;

(3) the reel can be operated by the other hand while the other hand is holding a handle;

(4) also when fighting against a fish, the switching operation of the switch-over element and the thumbing operation can be performed while the whole reel is being held by one hand, and the handle can be operated by the other hand, which eliminates the need to move both hands to extra positions;

(5) since the handle is situated nearer to the body of an angler, when operating the handle, not only the side of the angler can be kept closed to thereby be able to perform a fishline take-up operation smoothly and stably, but also the vibrations of the reel can be reduced;

(6) as an adjusting knob for pressure contact with the end portion of a spool shaft is disposed in front of the handle, the adjusting knob can be operated easily;

(7) because the handle for take-up operation is mounted on a reel side plate disposed in the rear of the spool shaft, the center of gravity of the reel and the mounting position of the handle lie nearer to the position of the hand holding the reel and, therefore, in casting, even if the reel is held while the spool is set in the thumbing operation allowable state, the reel is easy to hold as well as the fishing rod and reel are easy to swing;

(8) due to the fact that a level wind device is disposed on the front side of the spool shaft while a handle shaft is disposed on the rear side of the spool shaft, that is, they are disposed separately from each other, not only a drive portion can be mounted onto a reel main body in a well-balanced manner, but also the whole reel can be improved in balance; and, (9) since a traverse cam shaft, handle shaft and spool shaft are not crowded together in the front portion of the reel main body, the reel can be manufactured, assembled, dismantled and repaired easily and effectively.

The invention further provides a fishline parallel winding device for winding a fishline around a spool supported rotatably between the two side plates of a reel main body, the fishline parallel winding device comprising a drive element interposed between the two side plates, disposed on the opposite side of the fishline play-out side and reciprocatable in linking with the rotation of a handle, and an operation element with one portion thereof including a fishline guide member for guiding the fishline to the spool and with the other portion thereof being connected to the drive element, in which the fishline can be wound around the spool through the operation element and fishline guide member by means of the reciprocating movement of the drive element.

The fishline guide member, which winds the fishline uniformly around the spool in linking with the rotational motion of the spool, can be reciprocated by the drive element disposed on the opposite side of the fishline play-out side with respect to the spool. The drive element is interposed between the two side plates of the reel main body, is in engagement with a traverse groove formed in a traverse shaft which can be driven by operating a handle, and can be reciprocated together with the handle operation. To the drive element, there is connected one end side of the operation element supported by the reel main body, while the fishline guide member is provided on the other side of the operation element.

Since the drive element for reciprocating the fishline guide member as well as the traverse shaft are disposed on the opposite side of the spool fishline play-out side, seawater and the like are difficult to adhere to the traverse shaft to be engaged with the drive element and the whole reel can be improved in balance.

Further, since the handle shaft on which a reverse rotation preventive device, a drag device and the like are provided, and a part of the fishline parallel winding device are installed in the rear portion of the reel main body with respect to the spool, the center of gravity of the reel can be positioned rearwardly, i.e. nearer to the angler, to thereby enhance the operationability of the reel.

BRIEF DESCRIPTION OF THE DRAWINGS

FIGS. 1A and 1B are a sectional plan view and a partially enlarged sectional plan view, respectively, of the main portions of a first embodiment of a right-hand fishing reel of a double bearing type according to the invention;

FIG. 16A is a sectional plan view of the main portions of the fishing reel of a double bearing type and FIG. 16B is a partially enlarged sectional plan view thereof;

DETAILED DESCRIPTION OF THE PREFERRED EMBODIMENTS

Now, description will be given below of the preferred embodiments according to the invention with the accompanying drawings.

Figure 2:
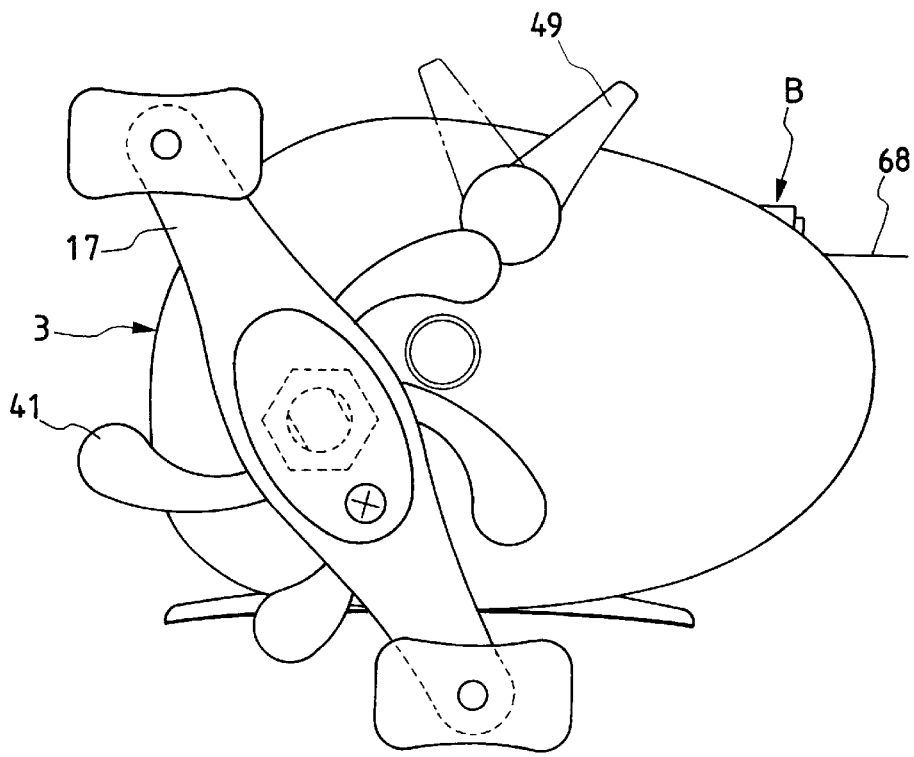
FIG. 2 is a right side view of the present fishing reel of a double bearing type.
Figure 4:
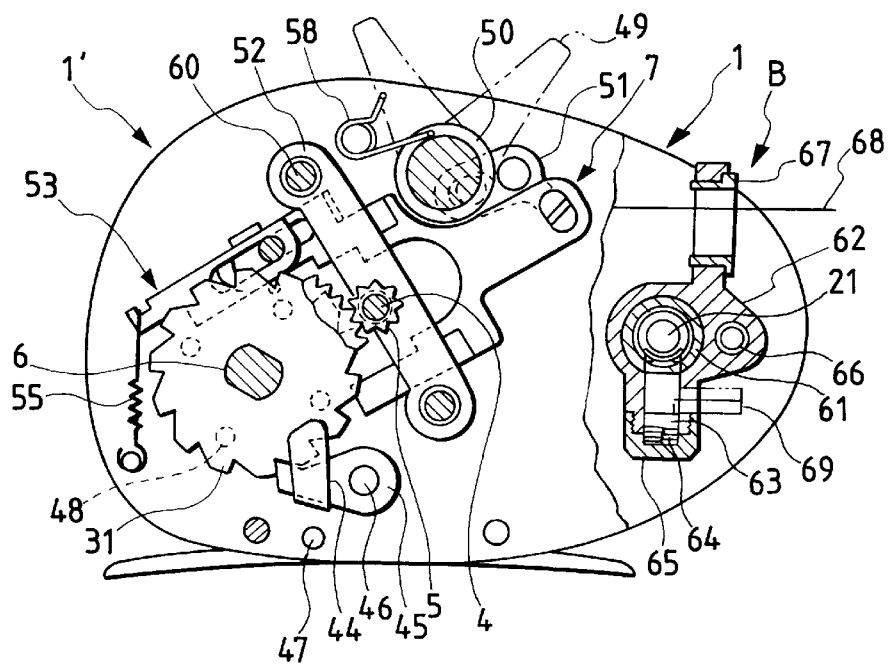
FIG. 4 is a sectional side view of the main portions of a right reel side plate employed in the present fishing reel of a double bearing type.
Figure 3:
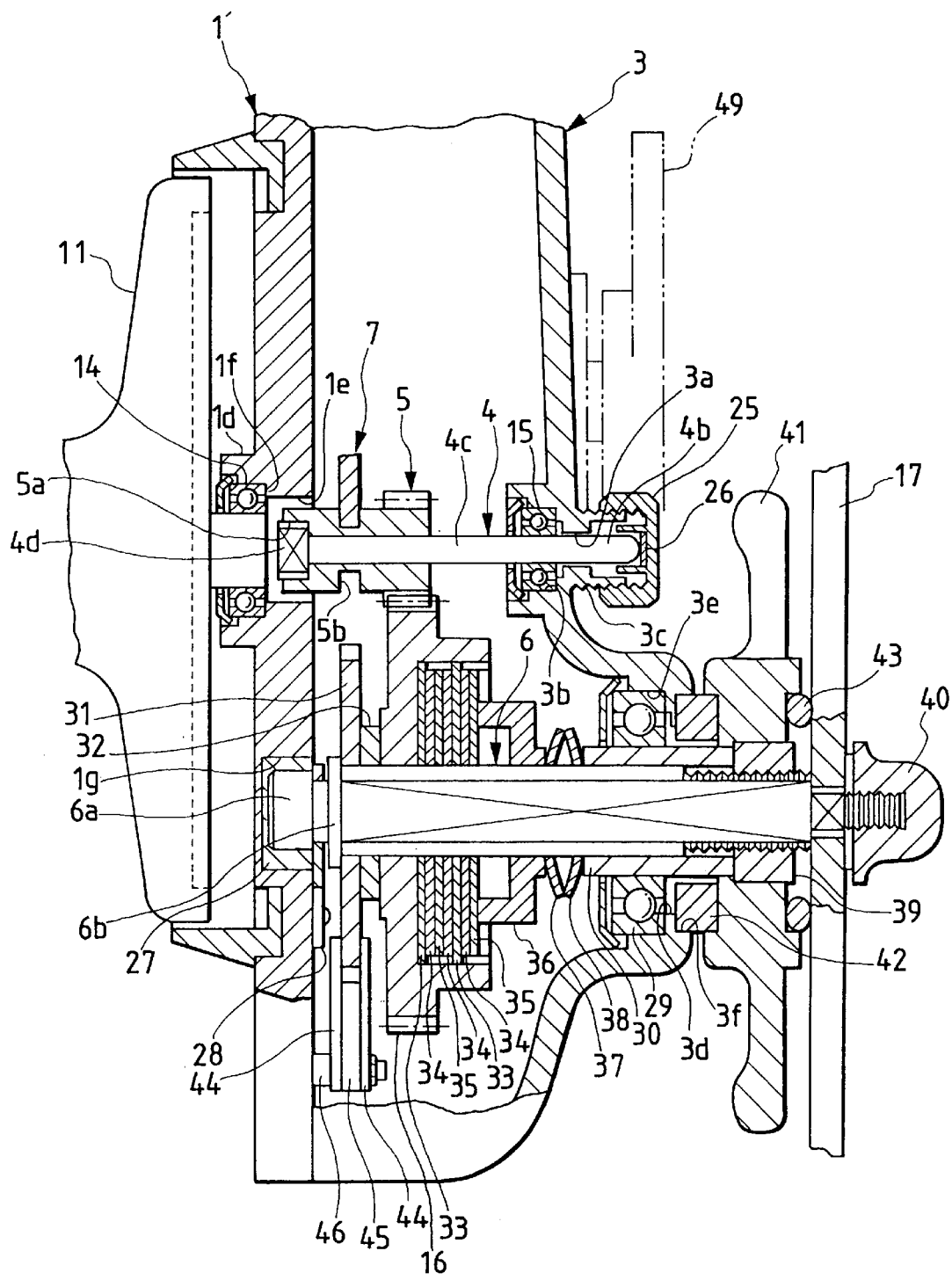
FIG. 3 is an enlarged sectional plan view of the main portions of the present fishing reel of a double bearing type.
Figure 5:
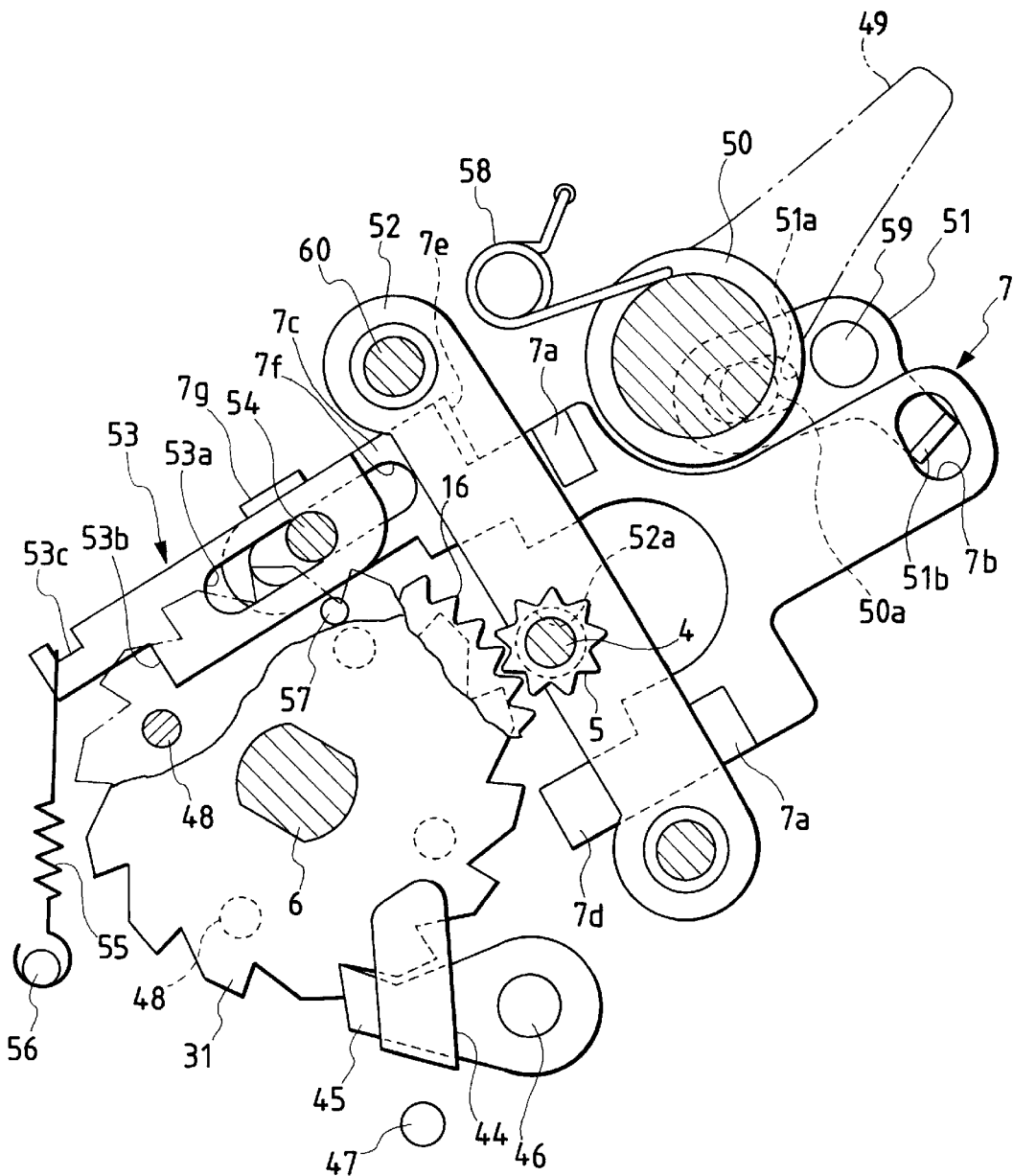
FIG. 5 is an enlarged sectional side view of the main portions of the right reel side plate shown in FIG. 4, illustrating a clutch-on state thereof.
Figure 6:
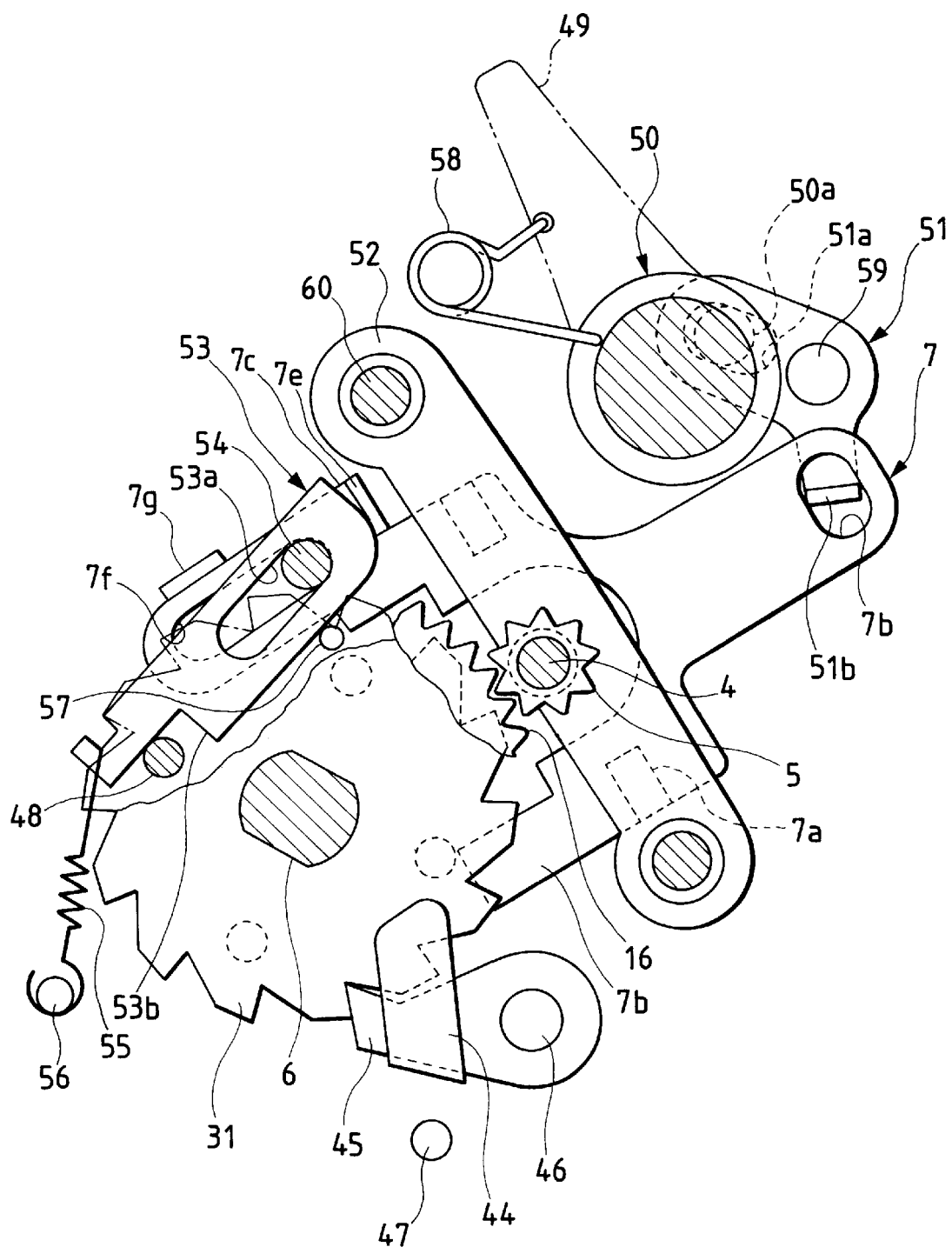
FIG. 6 is an enlarged sectional side view of the main portions of the right reel side plate shown in FIG. 4, illustrating a clutch-off state thereof.

In FIGS. 1A to 6, there is shown a right-handle fishing reel of a double bearing type according to a first embodiment of the invention. In particular, FIGS. 1A and 1B are a sectional plan view and a partially enlarged sectional plan view, respectively, of the main portions of a fishing reel of a double bearing type according to the invention, FIG. 2 is a right side view of the present fishing reel of a double bearing type, FIG. 3 is an enlarged sectional plan view of the main portions of the present fishing reel of a double bearing type, FIG. 4 is a sectional side view of the main portions of a right reel side plate employed in the present fishing reel of a double bearing type, FIG. 5 is an enlarged sectional side view of the main portions of the right reel side plate shown in FIG. 4, illustrating a clutch-on state thereof, and FIG. 6 is an enlarged sectional side view of the main portions of the right reel side plate shown in FIG. 4, illustrating a clutch-off state thereof.

According to the illustrated fishing reel of a double bearing type, the two left and right side frames 1 and 1' of a reel main body A are held in parallel and integrally with each other by a support plate 1a and a fixing plate 1b of a reel leg 10.

On the outside of the left side frame 1, there are mounted a support plate 1" and a reel side plate 2.

On the outside of the right side frame 1', there is mounted a reel side plate 3.

Between the two left and right side frames 1 and 1', there is interposed a spool 11 which is fixed to a spool shaft 4. The spool shaft 4 is rotatably journaled by a pair of bearings 12, 13 provided on one side and by another pair of bearings 14, 15 provided on the other side, and can be rotated through a clutch means, a pinion 5 fitted with the spool shaft 4, a drive gear 16 meshing with the pinion 5 and frictionally connected to the handle shaft 6, and a handle 17 mounted on the handle shaft 6.

The handle shaft 6 is disposed in the rear of the spool shaft 4 on the opposite side to the fishline play-out direction of the spool.

And, the reel side plate 2 and support plate 1" respectively include cylindrical portions 2a and 1c which are respectively formed on the inside thereof in such a manner that they project inwardly.

The bearing 12 is fitted and mounted into a recessed portion formed in the inside of the cylindrical portion 2a, while a thrust bearing 18 is fixed to the inside bottom surface of the cylindrical portion 2a and one end 4a of the spool shaft 4 is in contact with the thrust bearing 18.

On the other hand, the bearing 13 is mounted in a recessed portion formed in the inside of the cylindrical portion 1c.

A gear 19 is fitted with the outer periphery of one end 4a of the spool shaft 4, which is projected from the support plate 1" toward the reel side plate 2, in a rotation preventive manner, while the gear 19 is prevented from slipping off from the end 4a by an E ring 20.

Between the right and left side frames 1' and 1, there is interposed a level wind device (i.e. a fishline parallel winding device) B. In particular, the level wind device B is disposed in the portions of the right and left side frames that are respectively situated in front of the spool 11 on the fishline play-out direction side with respect to the spool 11, while a gear 22 is mounted on one end of a traverse cam shaft 21 which is provided in the level wind device B.

Also, between the gears 19 and 22, there is interposed a gear 24 which is journaled on a shaft 23 provided in the support plate 1" and also which is in mesh with the two gears 19 and 22.

As shown in FIGS. 1A, 1B and 3, the right side frame 1' includes a cylindrical portion 1d which is provided on and projected from the left, inner side of the frame 1'. The right side frame 1' further includes a through hole 1e and a recessed portion 1f which are respectively formed inside the cylindrical portion 1d.

The bearing 14 is fitted into and mounted to the recessed portion 1f.

On the other hand, the reel side plate 3 includes therein a through hole 3a and a recessed portion 3b.

The bearing 15 is fitted into and mounted to the recessed portion 3b, while the other end 4b of the spool 4 having a reduced diameter is journaled by the bearing 15.

A cylindrical portion 3c is formed on and projected from the right, outer side of the through hole 3a of the reel side plate 3, while a male screw portion is formed on the outer periphery of the cylindrical portion 3c.

An adjusting knob 25 for pressure contact with the end portion of the spool shaft 4 is in threaded engagement with the male screw portion, a thrust bearing 26 is fixed to the inside bottom surface of the adjusting knob 25, and the other end 4b of the spool shaft 4 having a reduced diameter is in contact with the thrust bearing 26.

The right side frame 1' includes on the right outer side thereof a recessed portion 1g into which a bearing 27 is fitted, while one end 6a of the handle shaft 6 is rotatably fitted with the bearing 27 and is prevented from slipping off from the bearing 27 by a slippage preventive plate 28.

The reel side plate 3 further includes a through hole 3d and a recessed portion 3e.

A bearing 29 is fitted into and mounted to the recessed portion 3e.

The handle shaft 6 is journaled by the bearing 29 through a collar 30 which is fitted with the handle shaft 6 in such a manner that it is movable in the axial direction of the handle shaft 6 but is prevented against rotation.

The spool shaft 4 includes a reduced diameter portion 4c extending between the right side frame 1' and reel side plate 3 and the pinion 5 is fitted with the reduced diameter portion 4c in such a manner that it can be freely moved in the axial direction of the spool shaft 4. The spool shaft 4 further includes an engaging portion 4d formed in the left end portion of the reduced diameter portion 4c. The engaging portion 4d of the spool shaft 4, the engaging portion 5a of the pinion 5, and a clutch operation element 7 cooperate together in forming a clutch mechanism.

The drive gear 16, which is rotatably fitted with the handle shaft 6, is in mesh with the pinion 5.

The handle shaft 6 includes one end portion 6a and a flange portion 6b which are respectively formed in the portion thereof situated on the left of the handle shaft 6. A reversal preventive ratchet wheel 31 and a friction plate 32 are fitted with the handle shaft 6 sequentially from the flange portion 6b in this order, while the ratchet wheel 31 is fitted with the handle shaft 6 in such a manner that it is prevented against rotation.

The drive gear 16 includes in the central portion thereof a storage portion which consists of a round hole and a recessed portion. And, a brake plate 33, a friction plate 34, a brake plate 35, a friction plate 34, a brake plate 33, a friction plate 34, and a brake plate 35 respectively cooperating in forming a drag mechanism are sequentially inserted into and stored in the storage portion of the drive gear 16.

Further, on the inner periphery of the storage portion, there are formed a pair of projections which extend in the axial direction of the drive gear 16, while the brake plate 33 is rotatably fitted with the outer periphery of the handle shaft 6 and is prevented against rotation by the pair of projections.

The brake plate 35 is fitted with the outer periphery of the handle shaft 6 in a rotation preventive manner and also is rotatably fitted with the drive gear 16.

A pressure disk 36, which is fitted with the handle shaft 6 in a rotation preventive manner, is in contact with the outermost brake plate 35 disposed on the opening side of the drive gear 16.

And, springs 37 and 38, which are respectively fitted with the handle shaft 6 in a rotation preventive manner, are in contact with the right side of the pressure disk 36.

The collar 30 is disposed adjacent to and in contact with the spring 38.

A nut 39, which is threadingly fitted with the handle shaft 6, is disposed adjacent to and in contact with the collar 30.

The handle 17 is fitted in a rotation preventive manner with the portion of the handle shaft 6 situated outside the nut 39 and is also prevented from slipping off from the portion of the handle 6 by a bag nut 40.

The nut 39 is fitted with a polygonal through hole formed in a drag adjusting knob 41 in such a manner that it can be moved back and forth in the axial direction of the handle shaft 6.

Between the drag adjusting knob 41 and the side portion of the reel side plate 3, there is interposed an intermediate member 42 which consists of a hard member formed of metal or synthetic resin or a hard felt, while, between the drag adjusting knob 41 and handle 17, there is interposed another intermediate member 43 consisting of an O-ring.

The reel side plate 3 includes a recessed portion 3f which is formed in the side portion of the reel side plate 3 that is situated outside the bearing 29 journaling the handle shaft 6 thereon, and the intermediate member 42 is rotatably fitted into the recessed portion 3f.

The reversal preventive ratchet wheel 31 is fitted with the handle shaft 6 in a rotation preventive manner and, as shown in FIGS. 3 and 4 to 6, a preventive reversal claw 45, which is held by and between two spring plates 44 and 44, is disposed on the outside portion of the ratchet wheel 31 in such a manner that it is rotatably journaled on a shaft 46. The two spring plates 44 and 44 hold the two opposite side surfaces of the ratchet wheel 31 between them, while the leading end portion of the reversal preventive claw 45 is engageable with securing teeth formed on the outer periphery of the ratchet wheel 31.

Outside the reversal preventive claw 45, there is provided a stop pin 47 against which the reversal preventive claw 45 can hit when it is rotated.

The ratchet wheel 31 includes a plurality of kick pins 48 which are respectively erected thereon.

The interior of the reel side plate 3 is formed as a gear box, and there is stored in the gear box a clutch mechanism which can be operated by the clutch operation element 7 that is advanceable and retreatable through a shaft portion 50 and a connecting plate 51 due to the rotation of a clutch lever 49.

The clutch mechanism includes the engaging portion 5a of the pinion 5 engageable with and disengageable from the engaging portion 4d of the spool shaft 4, a clutch cam 7a provided in the clutch operation element 7, a clutch plate 52, the plurality of kick pins 48 provided in the ratchet wheel 31, and a kick lever 53.

The clutch operation element 7 is slidable disposed in the right side frame 1', while the clutch operation element 7 includes the clutch cam 7a, an engaging portion 7b consisting of a laterally extending elongated hole, two forked extension pieces 7c and 7d, a bent engaging portion 7e, an elongated hole 7f formed in one of the extension pieces 7c, and a bent portion 7g formed on one side of the same extension portion 7c.

A pin 54, which is fixed to the right side frame 1', is fitted into the elongated hole 7f, a kick lever 53 is superimposed or stacked on top of the extension piece 7c, and the pin 54 is also fitted into an elongated hole 53a which is formed in the kick lever 53.

The kick lever 53 includes a cutaway portion 53b and a spring catch portion 53c, one end of a spring 55 is engaged with the spring catch portion 53c, and the other end of the spring 55 is engaged with a pin 56 which is fixed to the right side frame 1'.

And, a securing pin 57 is fixed to the portion of the right side frame 1' on the opposite side thereof to the extension piece 7c and kick lever 53.

The shaft portion 50 is rotatably supported by the reel side plate 3, and an eccentric engaging portion 50a formed in the shaft portion 50 is in engagement with an elongated hole 51a formed in the connecting plate 51 while an engaging portion 51b formed in the connecting plate 51 is in engagement with the engaging portion 7b or the laterally extending elongated hole formed in the clutch operation element 7.

Between the shaft portion 50 and right side frame 1', there is interposed a dead-point spring 58.

The connecting plate 51 is rotatably fitted with a shaft portion 59 which is fixed to the right side frame 1'.

The clutch plate 52 is fitted with two support members 60, 60 respectively having the two ends thereof fixed to the right side frame 1', and the engaging portion 4d of the spool shaft 4 and the engaging portion 5a of the pinion 5 are respectively energized in their engaging direction by springs (not shown).

The clutch plate 52 includes an arc-shaped recessed portion 52a which can be fitted into a groove 5b formed in the pinion 5.

Now, the level wind device B comprises a guide cylinder 61, a fishline guide member 62 which is slidable right and left along the outer periphery of the guide cylinder 61, the above-mentioned traverse cam shaft 21 journaled by two bearings (not shown) respectively fixed to the two end portions of the guide cylinder 61, an engaging member 63 which is engageable with a traverse groove formed in the traverse cam shaft 21 and is stored in the fishline guide member 62, a spring 64 for pushing up the engaging member 63, a cap 65 for holding the engaging member 63 in such a manner that the engaging member 63 is prevented from slipping off from the fishline guide member 62, and a guide rod 66 for holding the fishline guide member 62 in parallel to the guide cylinder 61.

A hard fishline guide ring 67 is fixed to the fishline guide member 62, and a fishline 68 is inserted through the hard fishline guide ring 67 before it is wound around the spool 11.

The traverse cam shaft 21 can be rotated in linking with the rotation of the spool shaft 4.

However, alternatively, the traverse cam shaft 21 may be structured such that it can be rotated in linking with the rotation of the handle shaft 6.

The engaging member 63 shown in FIG. 4 is structured such that, if the engagement of the engaging member 63 with the traverse groove is removed by pressing down a pin 69, then the fishline guide member 62 can be manually moved right and left in FIG. 1.

Referring now to the operation of the double bearing type fishing reel according to the first embodiment of the invention, if the handle 17 is rotated clockwise in FIGS. 4 and 5 in a clutch-on state in which the engaging portion 4d of the spool shaft 4 is in engagement with the engaging portion 5a of the pinion 5, then the pinion 5 is rotated through the drive gear 16 due to the rotation of the handle shaft 6 so that the fishline 68 can be taken up around the spool 11.

To adjust the brake force of the drive gear 16 frictionally connected to the handle shaft 6 through the drag mechanism, the drag adjusting knob 41 may be rotated.

That is, if the drag adjusting knob 41 is rotated, then the nut 39 is advanced or retreated to thereby push the collar 30, so that the brake plates 33 and 35 are respectively pressed against the drive gear 16 through the springs 37, 38 and pressure disk 36 as well as through the respective friction plates 34, thereby being able to adjust the brake force of the drive gear 16.

And, if the handle 17 is rotated, then the drive gear 16 is rotated clockwise as well as the ratchet wheel 31 is rotated clockwise due to a preset brake force.

If the ratchet wheel 31 is rotated clockwise, then the spring plates 44, 44 and reversal preventive securing claw 45 are rotated counterclockwise due to the friction produced between the ratchet wheel 31 and spring plates 44, 44 to thereby disengage the leading end of the reversal preventive securing claw 45 from the securing teeth of the ratchet wheel 31, so that the ratchet wheel 31 can be rotated integrally with the drive gear 16.

Next, if the spool 11 is rotated reversely due to the play-out of the fishline 68, then the drive gear 16 and ratchet wheel 31 are rotated counterclockwise and the spring plates 44, 44 and reversal preventive claw 45 are rotated clockwise, so that the leading end of the reversal preventive securing claw 45 is secured to the securing teeth of the ratchet wheel 31.

The securing of the leading end of the claw 45 to the securing teeth of the ratchet wheel 31 causes the rotation of the handle shaft 6 to stop, so that the drive gear 16 can be rotated against the preset brake force.

Next, as shown in FIG. 6, if the clutch lever 49 is rotated counterclockwise, then the eccentric engaging portion 50a of the shaft portion 50 causes the connecting plate 51 to rotate clockwise, while the engaging portion 51b of the connecting plate 51 causes the clutch operation element 7 to slide in the left downward direction.

Due to the sliding motion of the clutch operation element 7, the clutch plate 52 is lifted up by the clutch cam 7a to remove the engagement between the engaging portion 5a of the pinion 5 and the engaging portion 4d of the spool shaft 4, thereby turning the clutch mechanism into the clutch-off state thereof, so that the spool 11 can be freely rotated.

When the clutch operation element 7 is slid in the above-mentioned manner, since the extension piece 7c is also slid in the left downward direction as shown in FIG. 6, the kick lever 53, which has been prevented against rotation by the securing pin 57 and bent portion 7g, can be now rotated counterclockwise by the spring 55 and the cutaway portion 53b of the kick lever 53 is situated at a position where it is contactable with the kick pin 48.

Next, if the handle 17 is rotated in the fishline take-up direction, then the ratchet wheel 31 and drive gear 16 is rotated clockwise in FIG. 6, the kick pin 48 is contacted with the cutaway portion 53b of the kick lever 53 thereby push back the kick lever 53 in the right direction, the right end of the kick lever 53 pushes up the bent engaging portion 7e of the clutch operation element 7 to thereby retreat the clutch operation element 7, the engagement between the clutch cam 7a and the clutch plate 52 is removed and the engaging portion 5a of the pinion 5 is engaged with the engaging portion 4d of the spool shaft 4, thereby turning the reel into the clutch-on state.

In the clutch-on state, if the handle 17 is rotated clockwise, then the pinion 5 and spool shaft 4 are rotated to rotate the spool 11, and the fishline guide member 62 of the level wind device B is slid right and left along the outer periphery of the guide cylinder 61, so that the fishline 68 can be wound parallel around the spool 11.

The fishing reel of a double bearing type structured in the above-manner has the handle 17 which is located so that an axis $L_2$ of the handle 17 is situated within a space defined between an axis $L_1$ of the spool shaft 4 and a reference end point $P_2$ of the side plate 3 as shown in FIG. 1A. In FIG. 1A, the reference point $P_1$ is the farthest point of the side plate 3 from the axis $L_1$ of the spool shaft 4 in the fishline play-out direction F, and the other reference point $P_2$ is the farthest point of the side plate 3 from the axis $L_1$ in a direction opposite to the fishline play-out direction F.

With use of the fishing reel of a double bearing type structured in the above-mentioned manner, the following effects can be obtained:

That is, (1) since the handle 17 lies nearer to the body of the angler, during operating the handle 17 the arm and side of the angler can be closed tight to make it possible to perform the fishline take-up operation of the handle 17 smoothly and stably as well as to reduce the unpleasant oscillation of the reel.

Also, because the adjusting knob 25 for pressure contact with the end portion of the spool shaft 4 is situated in front of the handle 17, the adjusting operation of the adjusting knob 25 can be carried out easily.

(2) Due to the fact that the handle 17 for fishline take-up operation is mounted on the portion of the reel side plate 3 that is situated in the rear of the spool shaft 4, the center of gravity of the reel and the mounting position of the handle 17 lie nearer to the position of the hand holding the reel. Therefore, in casting, even if the reel is held in such a manner that the thumbing operation for the spool 11 can be performed, the reel is easy to hold as well as the fishing rod and reel are easy to swing.

(3) Since the level wind device B is disposed on the front side with respect to the spool shaft 4 and the handle shaft 6 is disposed on the rear side with respect to the spool shaft 4, that is, since they are arranged separately and remotely from each other, not only the drive portion can be mounted onto the reel main body A in a well-balanced manner but also the whole reel can be improved in balance.

Also, as the traverse cam shaft 21, handle shaft 6, and spool shaft 4 are not disposed collectively, the reel is improved in manufacture, assembly, dismantling and after-sales service.

Figure 7:
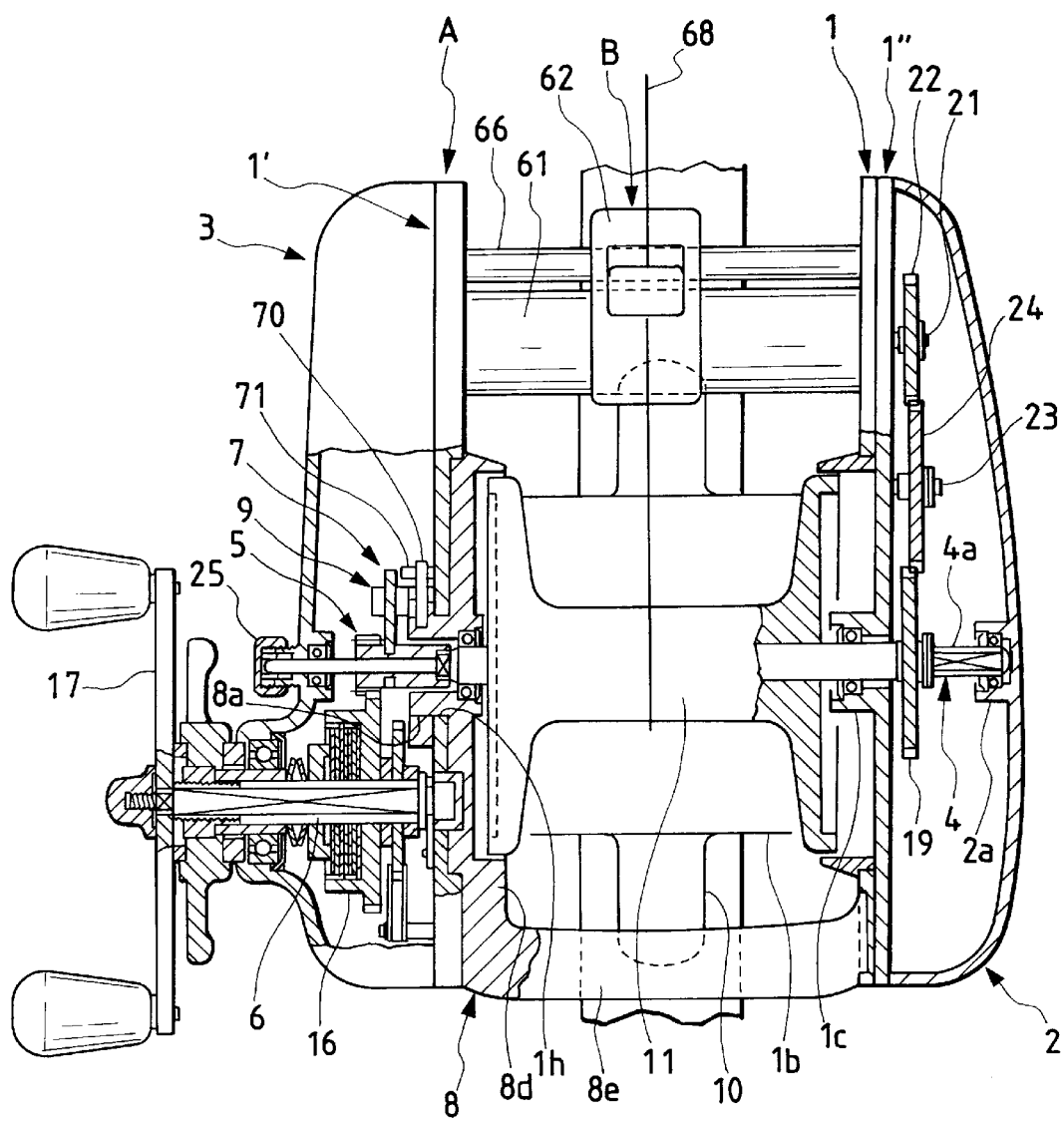
FIG. 7 is a sectional plan view of the main portions of a second embodiment of a left-hand fishing reel of a double bearing type according to the invention.
Figure 8:
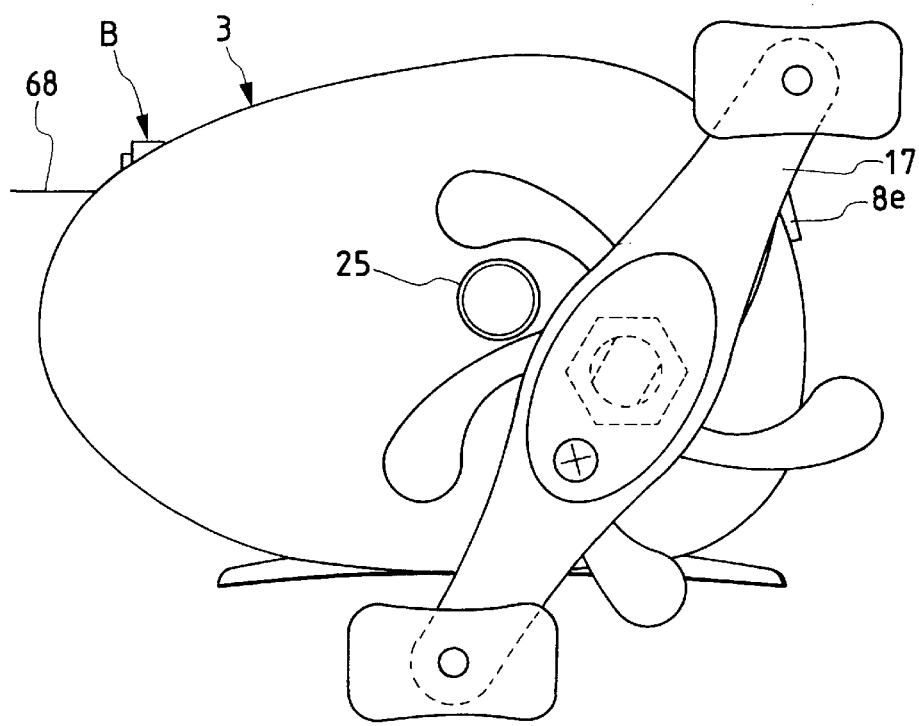
FIG. 8 is a left side view of the present fishing reel of a double bearing type.
Figure 10:
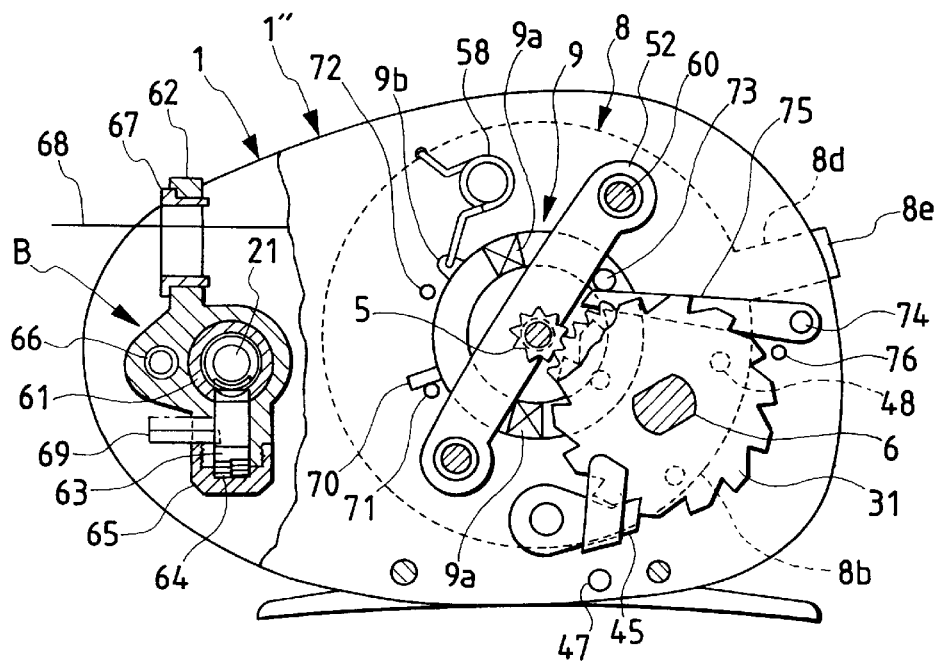
FIG. 10 is a sectional side view of the main portions of a left reel side plate employed in the present fishing reel of a double bearing type.
Figure 9:
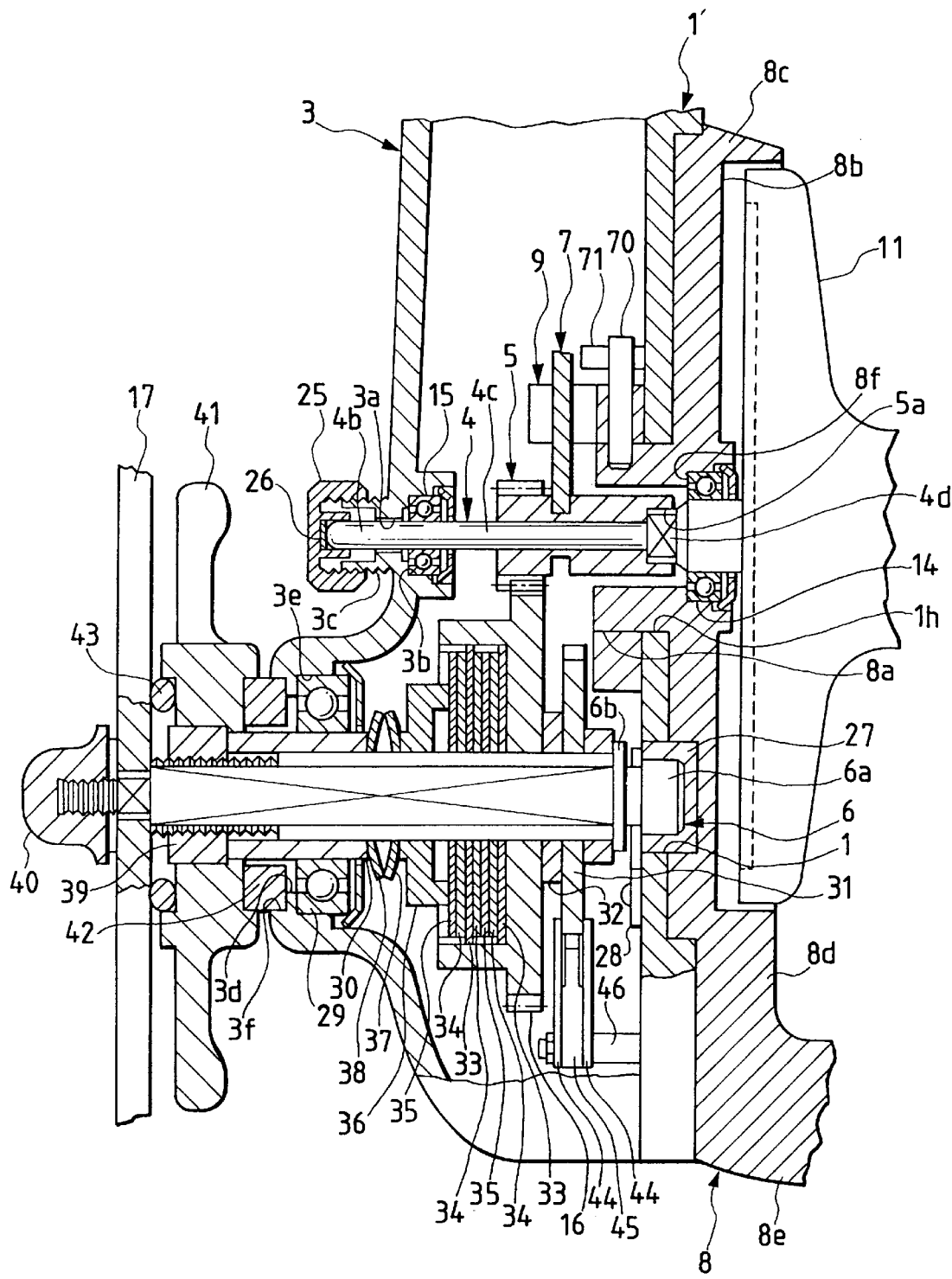
FIG. 9 is an enlarged sectional plan view of the main portions of the present fishing reel of a double bearing type.
Figure 11:
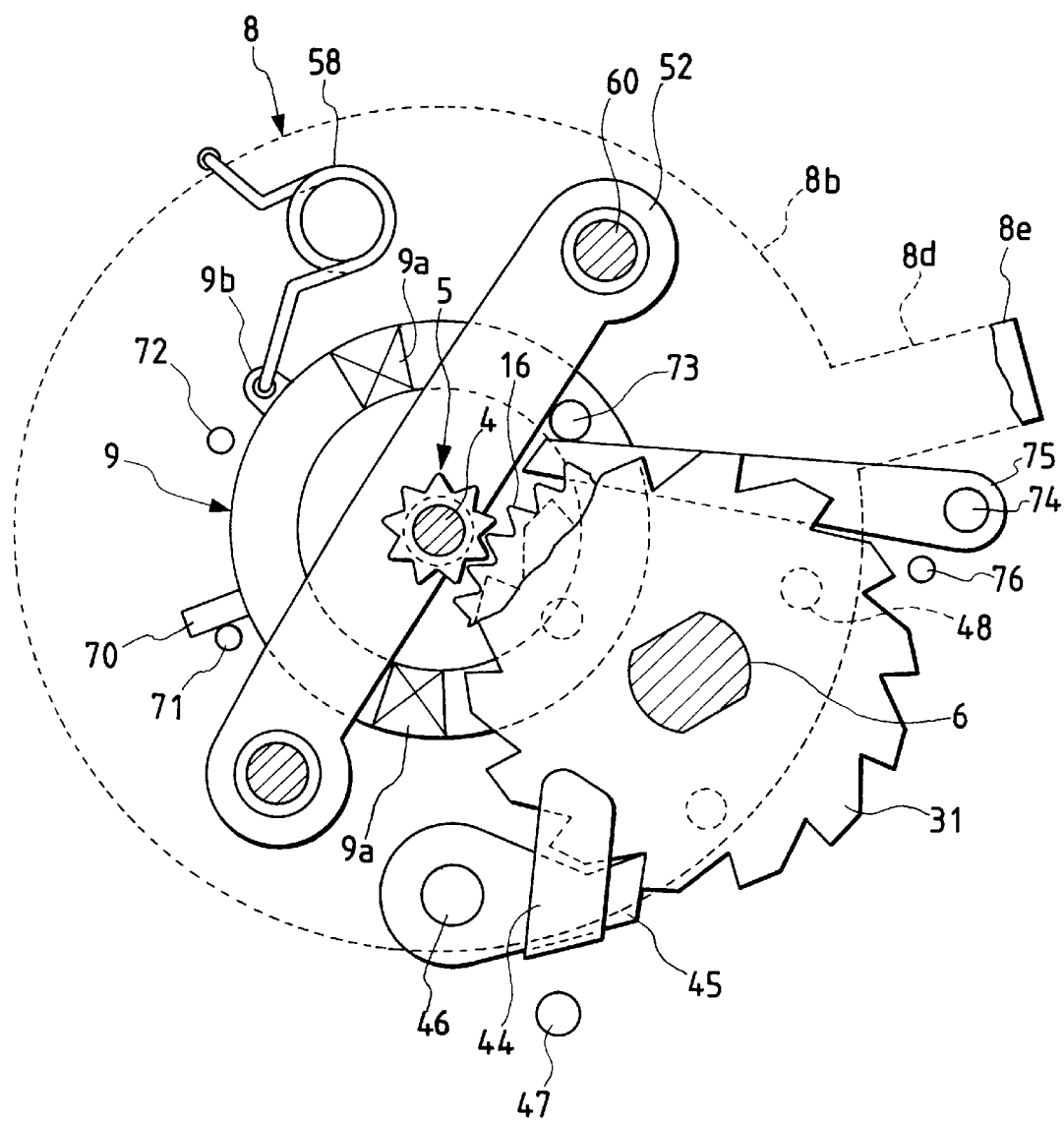
FIG. 11 is an enlarged sectional side view of the main portions of the right reel side plate shown in FIG. 10, illustrating a clutch-on state thereof.
Figure 12:
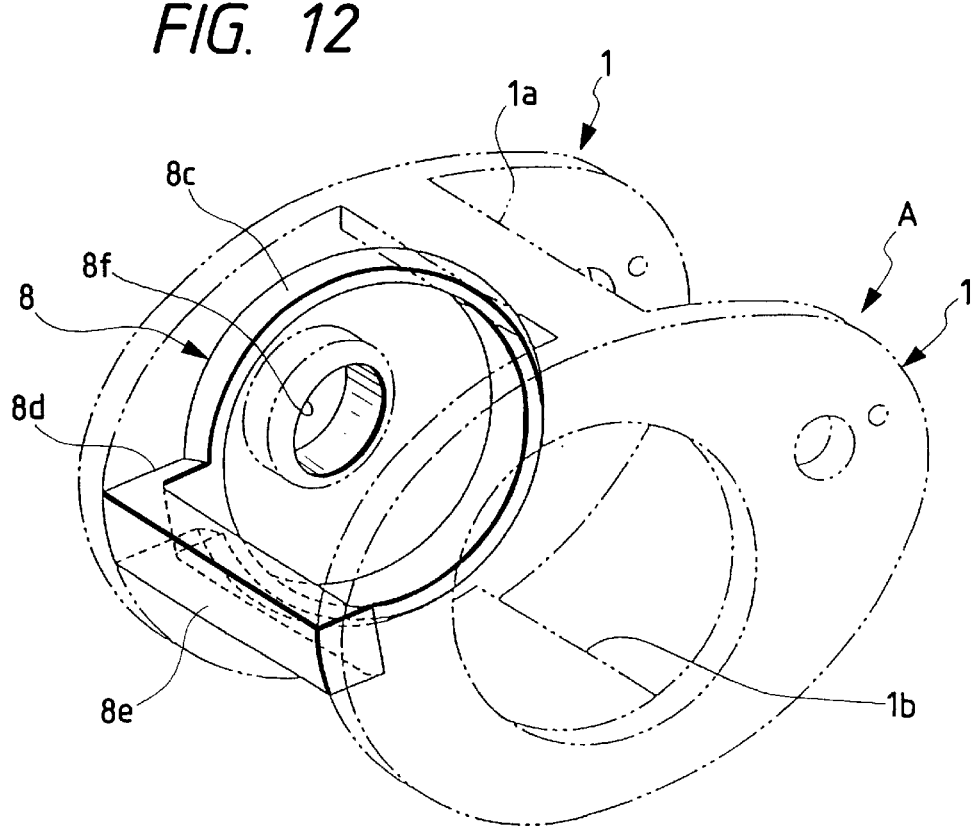
FIG. 12 is a perspective view of two right and left side frames employed in the present fishing reel.
Figure 13:
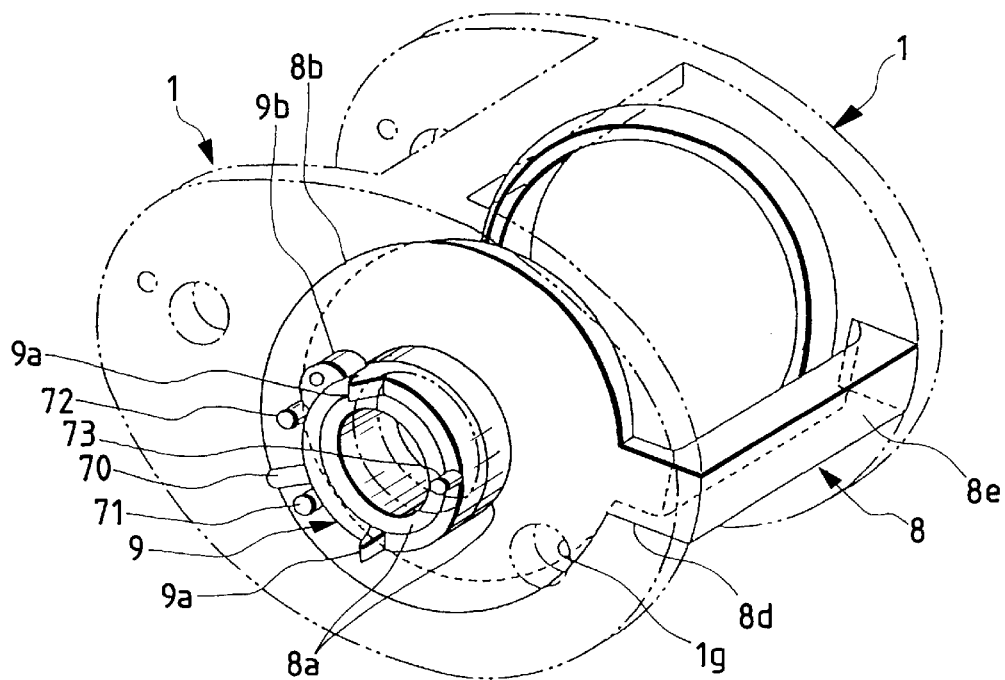
FIG. 13 is a perspective view of the two right and left side frames with a clutch operation element assembled thereto.
Figure 14:
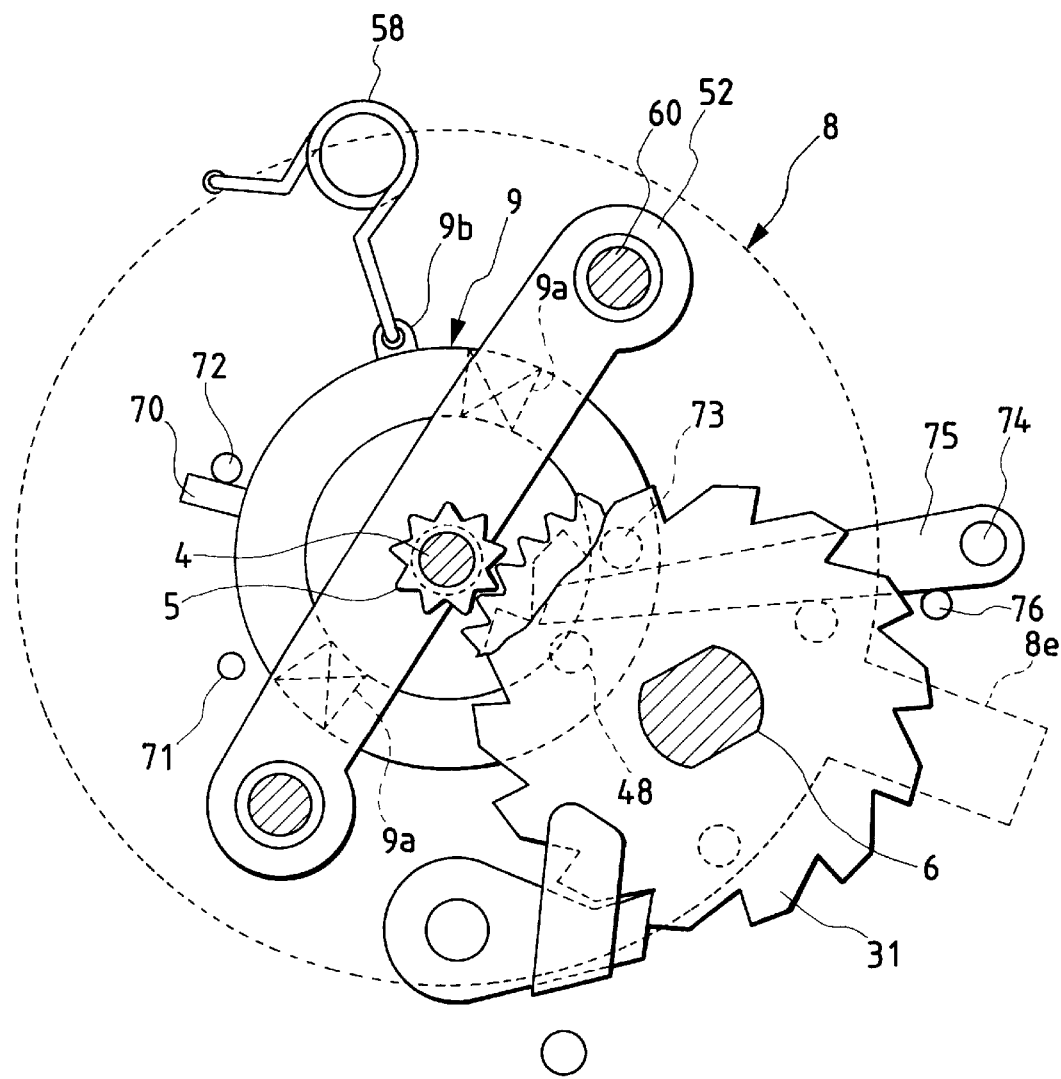
FIG. 14 is an enlarged sectional side view of the main portions of the right reel side plate shown in FIG. 10, illustrating a clutch-off state thereof.

Now, in FIGS. 7 to 14, there is shown a left-handle fishing reel of a double bearing type according to a second embodiment of the invention. In particular, FIG. 7 is a sectional plan view of the main portions of the present fishing reel of a double bearing type, FIG. 8 is a left side view of the present fishing reel of a double bearing type, FIG. 9 is an enlarged sectional plan view of the main portions of the present fishing reel of a double bearing type, FIG. 10 is a sectional side view of the main portions of a left reel side plate of the present fishing reel of a double bearing type, FIG. 11 is an enlarged sectional side view of the main portions of the left reel side plate shown in FIG. 10, illustrating a clutch-on state thereof, FIG. 12 is a perspective view of the two right and left side frames of a reel main body, FIG. 13 is a perspective view of the two right and left side frames with a clutch operation element assembled thereto, and FIG. 14 is an enlarged sectional side view of the main portions of the left reel side plate shown in FIG. 10, illustrating a clutch-off state thereof.

In the second embodiment, a cylindrical portion 8a of a clutch operation element 8 serving also as a spool cover for a spool 11 is rotatably fitted into a through hole 1h formed in a left side frame 1' of a reel main body A.

The clutch operation element 8 includes the cylindrical portion 8a, a disk plate portion 8b, a spool cover 8c, an arm portion 8d, and a clutch operation portion 8e extending from the arm portion 8d at right angles in the right side frame 1 direction.

The cylindrical portion 8a includes therein a recessed portion 8f, and a bearing 14 for journaling a spool shaft 4 is mounted in the recessed portion 8f.

A cylindrical cam member 9 is fixed to the outer periphery of the cylindrical portion 8a by a pin 70.

The pin 70 projects outwardly from the outer periphery of the cam member 9 and is interposed between two stop pins 71 and 72 which are respectively fixed to the left side frame 1'.

The cam member 9 includes a clutch cam 9a which is formed on and projected from the end face of the cam member 9, and a pin 73 is fixed to the clutch cam 9a.

Also, the cam member 9 includes a spring catch portion 9b in the outer periphery thereof and a dead point spring 58 is provided between the spring catch portion 9b and the left side frame 1'.

A shaft portion 74 is fixed to the portion of the left side frame 1' situated outside the ratchet wheel 31 and a kick lever 75 is rotatably journaled by the shaft portion 74.

The leading end portion of the kick lever 75 is inserted between a kick pin 48 and the pin 73.

A stop pin 76 is fixed to the portion of the left side frame 1' situated outside the kick lever 75.

The remaining portions of the second embodiment are substantially the same as the first embodiment except that the right and left sides thereof are reversed.

Referring now to the operation of the second embodiment of a fishing reel of a double bearing type according to the invention, in the clutch-on state in which the engaging portion 4d of the spool shaft 4 is in engagement with the engaging portion 5a of the pinion 5 as shown in FIGS. 7 and 9, if the handle 17 is rotated counterclockwise in FIGS. 10 and 11, then the pinion 5 is rotated through the drive gear 16 due to the rotation of the handle shaft 6 so that the fishline 68 can be taken up around the spool 11.

Next, if the spool 11 is rotated reversely due to the play-out of the fishline, the drive gear 16 and ratchet wheel 31 are rotated clockwise as well as the spring plates 44, 44 and reversal preventive claw 45 are rotated clockwise, so that the leading end of the reversal preventive claw 45 is secured to the securing teeth of the ratchet wheel 31.

Since the rotation of the handle shaft 6 is stopped due to this securing of the claw 45 leading end to the securing teeth, the drive gear 16 can be rotated against the previously set brake force.

Next, if the clutch operation portion 8e is pressed down, then the clutch operation element 8 and cam member 9 are rotated as shown in FIG. 14.

Due to this rotation, the clutch plate 52 is lifted up by the clutch cam 9a to thereby remove the engagement between the engaging portion 5a of the pinion 5 and the engaging portion 4d of the spool shaft 4, that is, the reel is turned into the clutch-off state, so that the spool 11 is now free to rotate.

If the clutch operation element 8 and cam member 9 are rotated, then the pin 73 is also rotated so that the kick lever 75 is pressed down counterclockwise.

Next, if the handle 17 is rotated in the fishline take-up direction, then the ratchet wheel 31 and drive gear 16 are rotated counterclockwise in FIG. 14, and the kick pin 48 is brought into contact with the kick lever 75 to thereby push up the kick lever 75, with the result that the pin 73 is pushed up and is rotated counterclockwise.

This counterclockwise rotation of the pin 73 causes the clutch operation element 8 and cam member 9 to rotate, and thus the clutch plate 52 is pushed up by the clutch cam 9a to thereby bring the engaging portion 5a of the pinion 5 into engagement with the engaging portion 4d of the spool shaft 4, so that the reel is turned into the clutch-on state.

In the clutch-on state, if the handle 17 is rotated counterclockwise, then the pinion 5 and spool shaft 4 are rotated to thereby rotate the spool 11 and thus the fishline guide member 62 of the level wind device B is slid right and left along the guide cylinder 61, so that the fishline 68 can be wound parallel around the spool 11.

Although in the above description the reel main body A is structured such that the left and right side frames 1, 1', support plate 1a and fixing plate 1b are formed integrally with one another, this is not limitative but, alternatively, the three components may be formed separately from one another as well as the left and right side frames 1 and 1' may be held parallel to each other.

Figure 17:
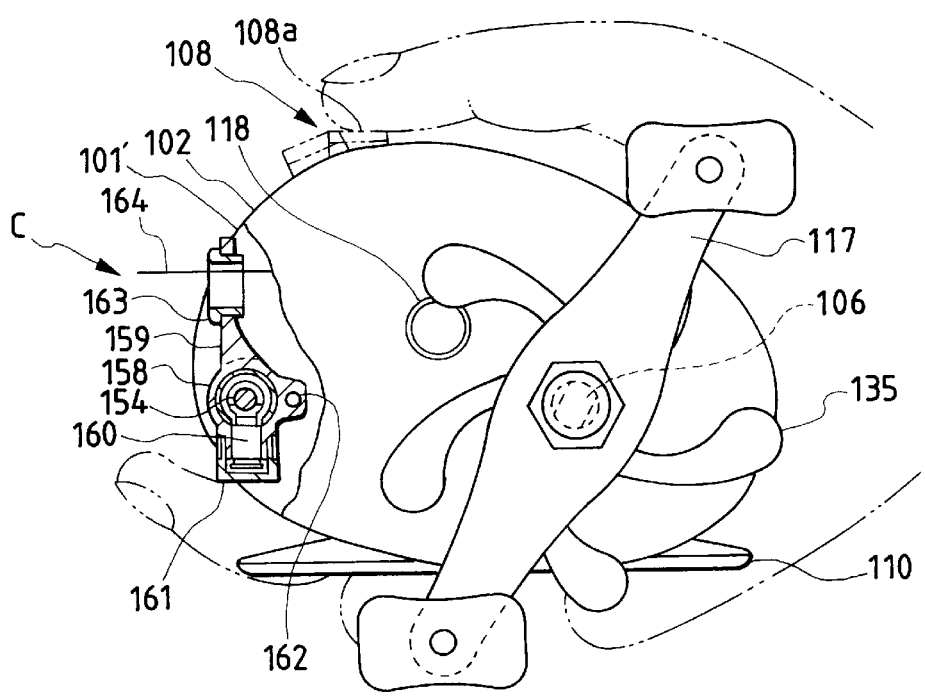
FIG. 17 is a partially sectional side view of the fishing reel of a double bearing type.
Figure 18:
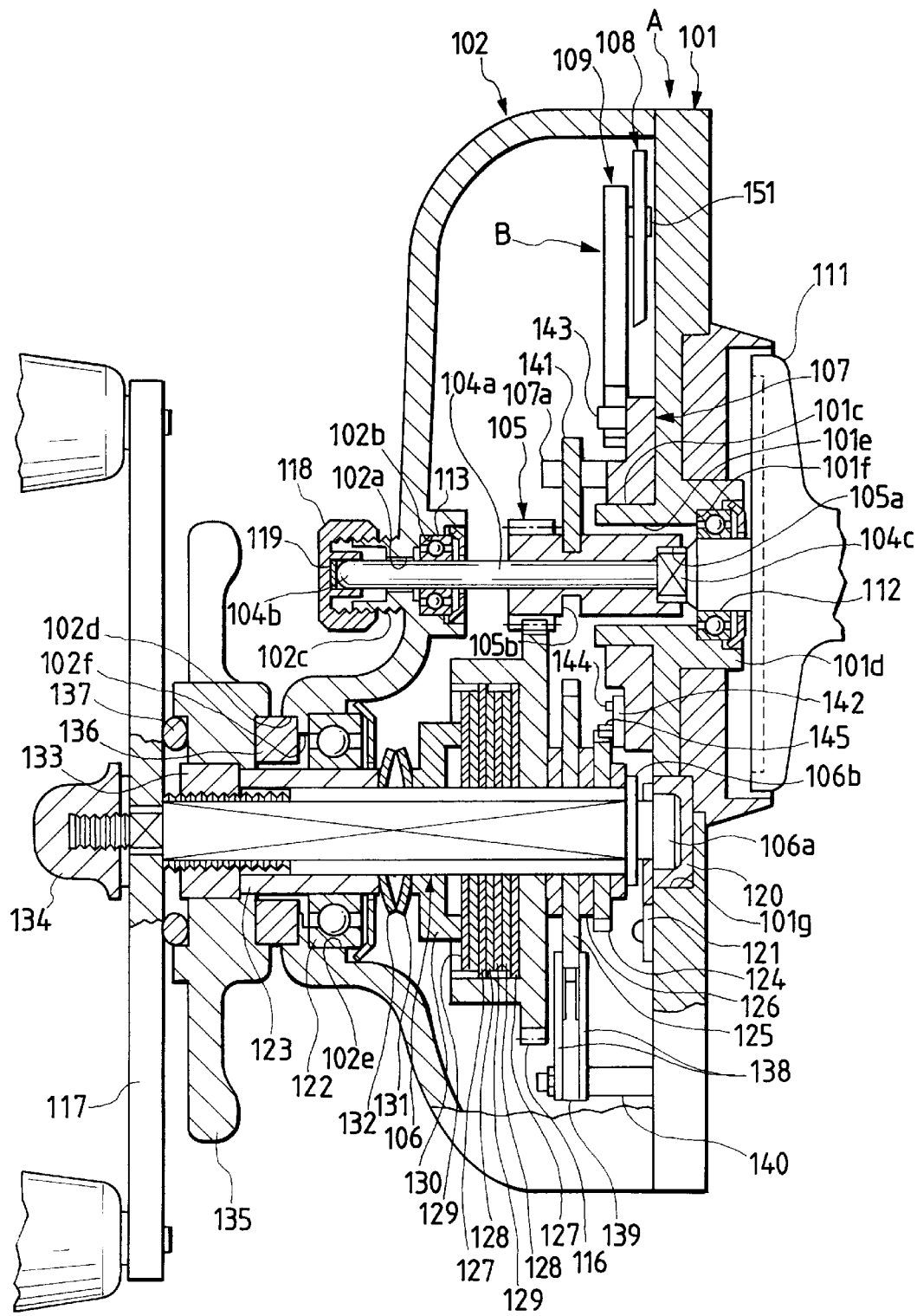
FIG. 18 is an enlarged sectional plan view of the main portions of the fishing reel of a double bearing type.
Figure 19:
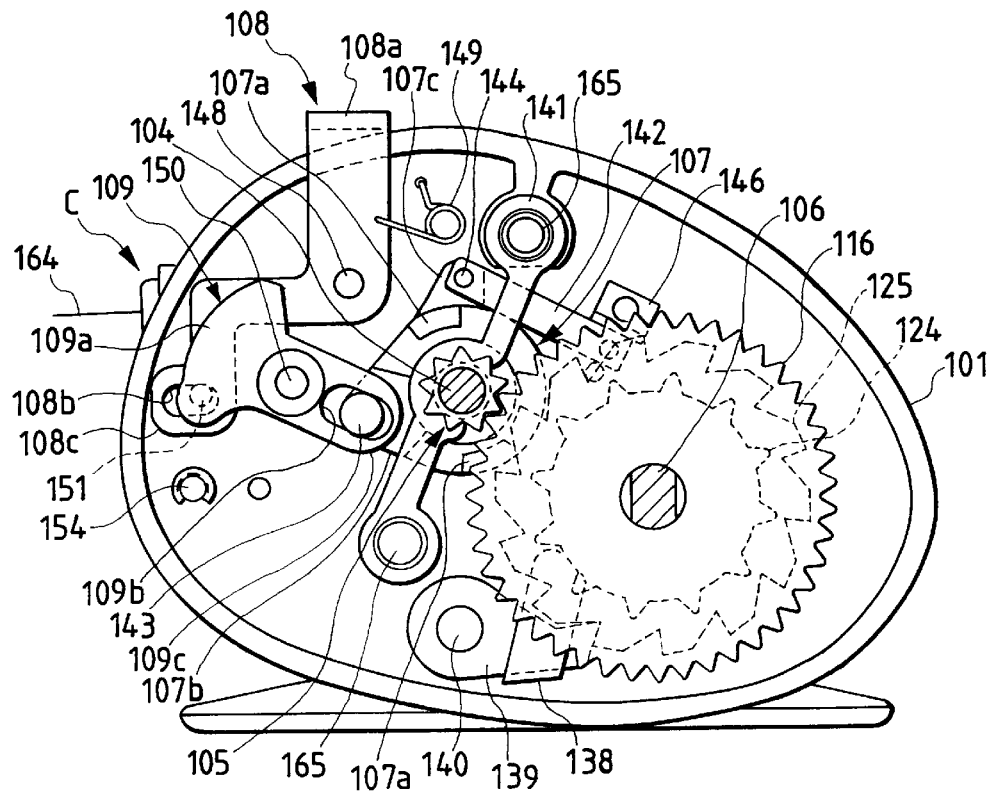
FIG. 19 is a sectional side view of the main portions of a left reel side plate employed in the fishing reel of a double bearing type, showing a clutch-on state thereof.
Figure 20:
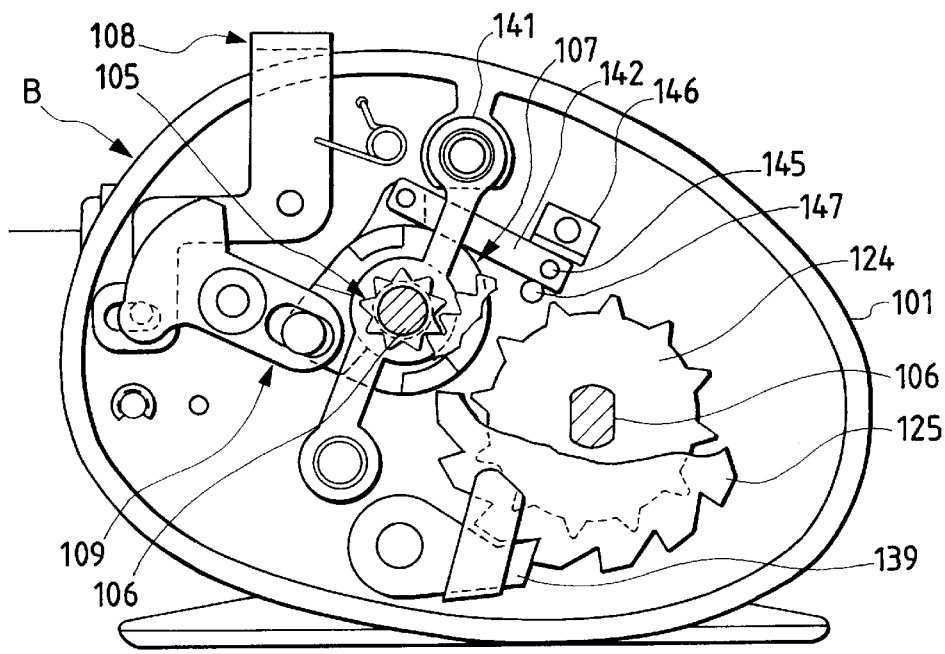
FIG. 20 is a sectional side view of the main portions of the left reel side plate disposed on the lower side of a drive gear shown in FIG. 19.
Figure 21:
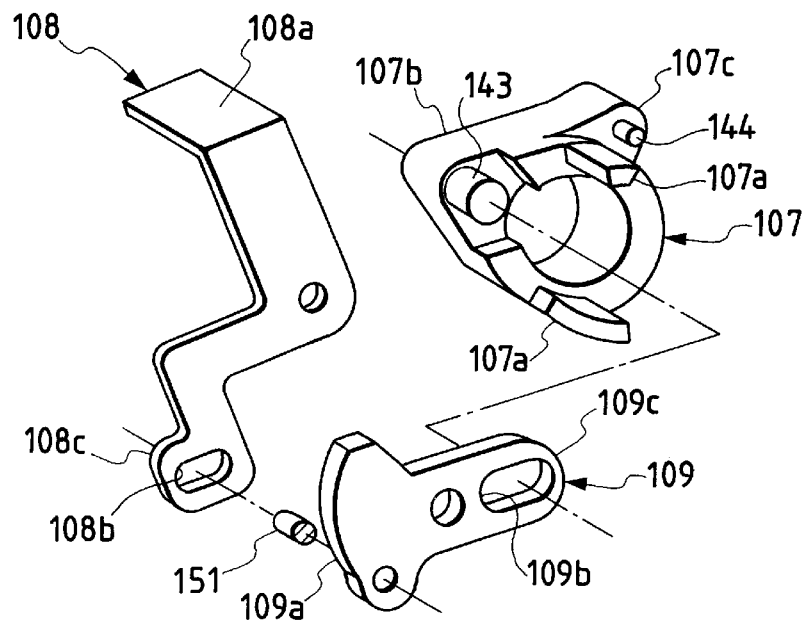
FIG. 21 is an exploded perspective view of a switch-over element, an intermediate member, and a clutch operation element respectively included in a clutch mechanism employed in the present invention.
Figure 22:
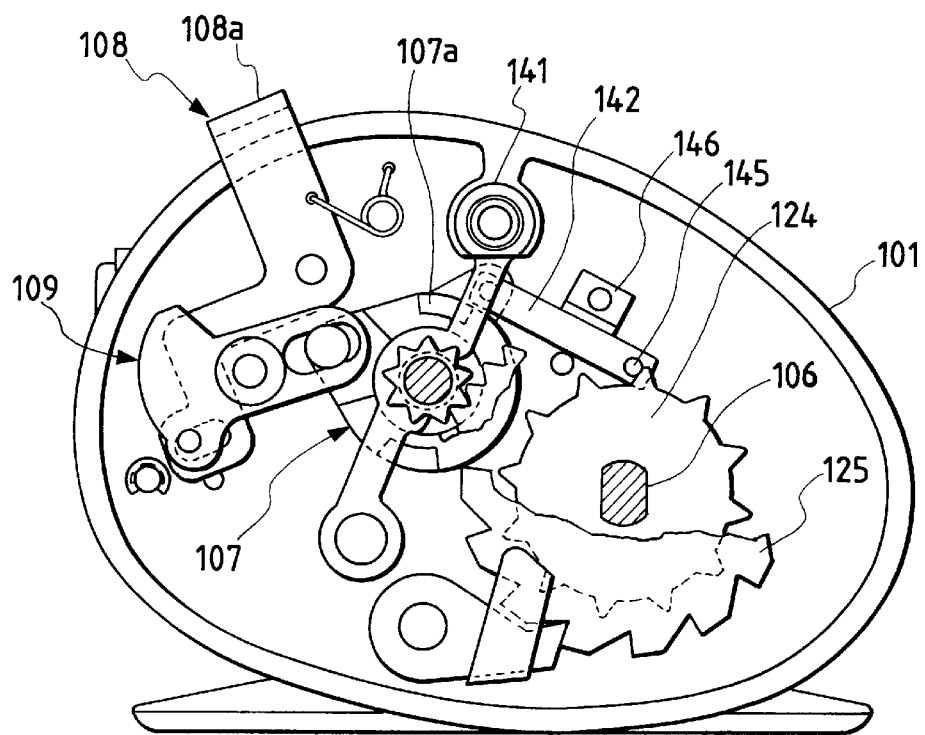
FIG. 22 is a sectional side view of the main portions of the left reel side plate, showing a clutch-off state thereof.
Figure 23:
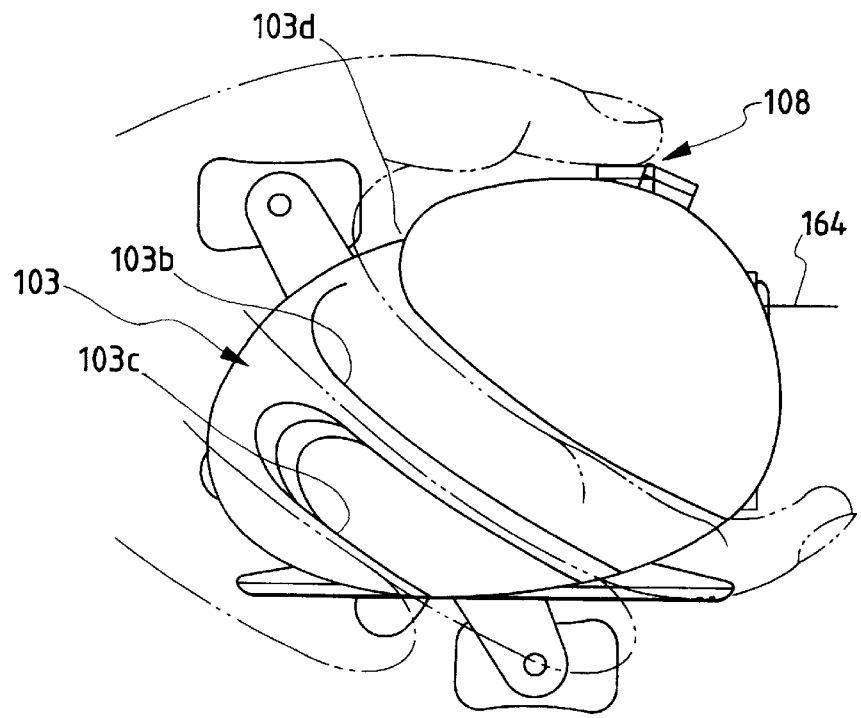
FIG. 23 is a side view of a right reel side plate employed in the fishing reel of a double bearing type.

Now, description will be given below of a fishing reel of a double bearing type according a third embodiment of the invention. Assuming that the present invention is applied to a left-handle reel, FIG. 15 is a plan view of the fishing reel of a double bearing type, FIGS. 16A and 16B are a sectional plan view of the main portion of the present fishing reel of a double bearing type and a partially enlarged sectional plan view thereof, respectively, FIG. 17 is a partially sectional side view of the present fishing reel of a double bearing type, FIG. 18 is an enlarged sectional plan view of the main portions of the present fishing reel of a double bearing type, FIG. 19 is a sectional side view of the main portions of a reel left side plate employed in the present fishing reel of a double bearing type, showing a clutch-on state thereof, FIG. 20 is a sectional side view of the main portions of the left side plate situated on the lower side of a drive gear shown in FIG. 19, FIG. 21 is an exploded perspective view of a switch-over element, an intermediate member, and a clutch operation element respectively included in a clutch mechanism employed in the present fishing reel of a double bearing type, FIG. 22 is a sectional side view of the main portions of the clutch mechanism, showing a clutch-off state thereof, and FIG. 23 is a side view of a right reel side plate employed in the present fishing reel of a double bearing type.

Figure 15:
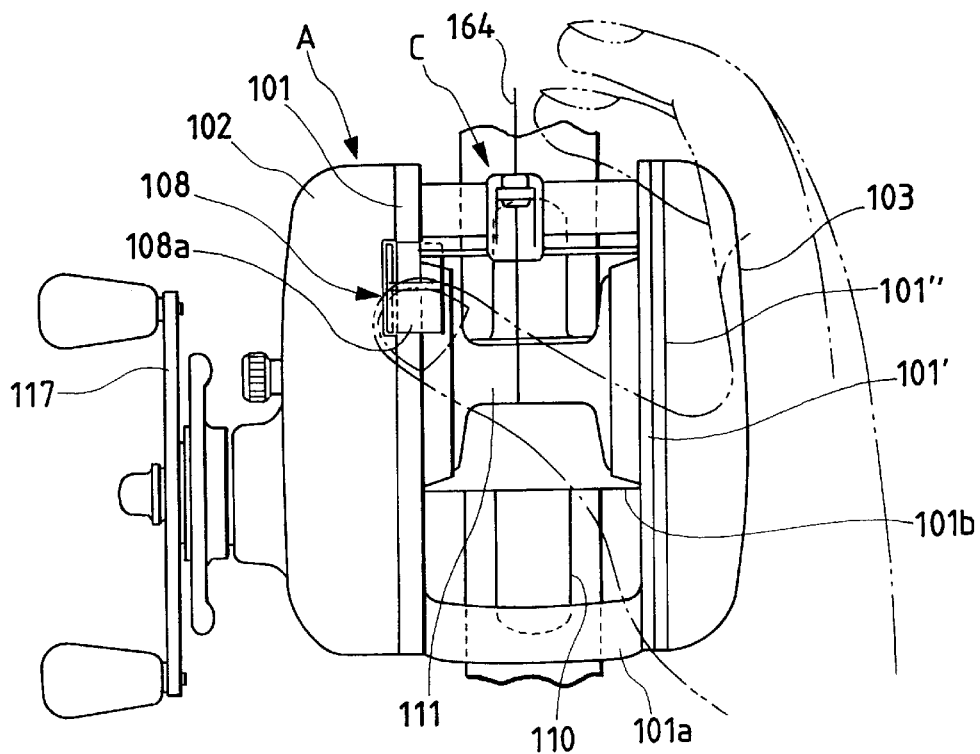
FIG. 15 is a plan view of a third embodiment of a fishing reel of a double bearing type according to the invention.

In the fishing reel of a double bearing type shown in FIG. 15, the two right and left side frames 101 and 101' of the reel main body A are held in parallel and integrally to each other by a support plate 101a and a fixing plate 101b of a reel leg 110.

A reel side plate 102 is mounted on the outside of the left side frame 101.

A support plate 101" and a reel side plate 103 are mounted on the outside of the right side frame 101'.

A spool 111 is fixedly disposed on a spool shaft 104 between the two right and left side frames 101 and 101' as shown in FIGS. 16A and 16B. The spool shaft 104 is rotatably journaled by two bearings 112, 113 disposed on one side and another two bearings 114, 115 disposed on the other side, and the spool shaft 104 can be rotated through a clutch mechanism, a pinion 105 fitted with the spool shaft 104, a drive gear 116 frictionally connected with a handle shaft 106, and a handle 117 mounted on the handle shaft 106.

The handle shaft 106 is disposed in the rear of the spool shaft 104, that is, on the opposite side to the fishline play-out direction of the spool shaft 104.

As shown in FIGS. 16A, 16B, 18 to 20, the left side frame 101 of the reel main body A includes two cylindrical portions 101c and 101d respectively formed in the two surfaces thereof, and a cylindrical clutch operation element 107 is rotatably fitted with the outer peripheral portion of the cylindrical portion 101c.

Within the cylindrical portions 101c and 101d, there is formed a through hole 101e, and, within the cylindrical portion 101d, there is formed a recessed portion 101f into which is mounted the bearing 112 for journaling the spool shaft 104.

In the reel side plate 102, there are formed a through hole 102a and a recessed portion 102b.

The bearing 113 is fitted and mounted into the recessed portion 102b, while the reduced diameter portion 104a of the spool shaft 104 is journaled by the bearing 113.

On the left outer side of the through hole 102a of the reel side plate 102, there is projectingly formed a shaft cylinder portion 102c which includes a male screw on the outer periphery thereof.

An adjusting knob 118 for pressure contact with the end portion of the spool shaft is in threaded engagement with the male screw, a thrust bearing 119 is fixed to the inside bottom surface of the adjusting knob 118, and one end 104b of the spool shaft 104 having a reduced diameter is in contact with the thrust bearing 119.

The left side frame 101 includes on the outside thereof a recessed portion 101g into which a bearing 120 is fitted, while one end 106a of the above-mentioned handle shaft 106 is rotatably fitted with the bearing 120 and is also prevented from slipping off the bearing 120 by a slippage preventive plate 121.

In the reel side plate 102, there are formed a through hole 102d and a recessed portion 102e.

A bearing 122 is fitted into and mounted to the recessed portion 102e.

The handle shaft 106 is journaled by the bearing 122 through a collar 123 which is fitted with the handle shaft 106 in such a manner that the collar 123 is movable in the axial direction of the handle shaft 106 but is prevented against rotation.

The pinion 105 is fitted with the reduced diameter portion 104a of the spool shaft 104 between the left side frame 101 and reel side plate 102 in such a manner that the pinion 105 is movable in the axial direction of the spool shaft 104, while the engaging portion 104c of the spool shaft 104 and the engaging portion 105a of the pinion 105 cooperate together in forming the engaging portion of a clutch mechanism B.

The pinion 105 is in mesh with a drive gear 116 which is rotatably fitted with the handle shaft 106.

The handle shaft 106 includes on the left side of the drive gear 116 one end 106a and a flange portion 106b, while a kick gear 124 and a reversal preventive ratchet wheel 125 with a friction plate 126 between them are sequentially pressed against and fitted with the flange portion 106b, so that the kick gear 124 and ratchet wheel 125 are fitted with the handle shaft 106 in a rotation preventive manner.

The kick gear 124 includes a plurality of kick projections respectively formed in and projected from the outer periphery thereof.

The drive gear 116 includes in the central portion thereof a storage portion consisting of a round hole and a recessed portion, into which storage portion a brake plate 127, a friction plate 128, a brake plate 129, a friction plate 128, a brake plate 127, a friction plate 128, and a brake plate 129 respectively forming a drag mechanism are sequentially inserted and stored.

Further, the storage portion includes on the inner periphery thereof a pair of projections which extend in the axial direction of the storage portion, while the brake plate 127 is fitted with the pair of projections in a rotation preventive manner and also is rotatably fitted with the outer periphery of the handle shaft 106.

The brake plate 129 is fitted with the outer periphery of the handle shaft 106 in a rotation preventive manner and also is rotatably fitted with the drive gear 116.

A pressure disk 130, which is fitted with the handle shaft 106 in a rotation preventive manner, is in contact with the brake plate 129 disposed on the opening side of the drive gear 116.

Springs 131 and 132, which are respectively fitted with the handle shaft 106 in a rotation preventive manner, are in contact with the right side of the pressure disk 130.

The above-mentioned collar 123 is disposed in the neighborhood of and also in contact with the spring 132.

A nut 133, which is in threaded engagement with the handle shaft 106, is disposed in the neighborhood of and in contact with the collar 123.

The handle 117 is fitted with the portion of the handle shaft 106 outside the nut 133 in a rotation preventive manner and is prevented from slipping off the handle shaft 106 by a bag nut 134.

The nut 133 is fitted with a polygonal through hole formed in a drag adjusting knob 135 in such a manner that it is freely movable back and forth in the axial direction of the drag adjusting knob 135.

In the side portion of the reel side plate 102 outside the bearing 122 by which the handle shaft 106 is journaled, there is formed a recessed portion 102f. Between the recessed portion 102f and the drag adjusting knob 135, there is rotatably interposed an intermediate member 136 which is formed of a synthetic resin hard material or a hard felt. And, between the drag adjusting knob 135 and handle 117, there is interposed another intermediate member 137 which is formed of an O-ring.

The above-mentioned reversal preventive ratchet wheel 125 is fitted with the handle shaft 106 in a rotation preventive manner and, as shown in FIGS. 16A, 16B and 18, a reversal preventive claw 139 held by and between two spring plates 138 and 138 is rotatably journaled on the outside of the ratchet wheel 125, the two spring plates 138 and 138 hold the two side surfaces of the ratchet wheel 125 between them, and the leading end of the reversal preventive claw 139 is freely engageable with securing teeth formed in the outer periphery of the ratchet wheel 125.

The interior of the reel side plate 102 is structured as a gear box and, in the gear box, there is stored the clutch mechanism B structured such that the above-mentioned clutch operation element 107 can be operated or rotated by operating or rotating the switch-over element 108 through the intermediate member 109.

The clutch mechanism B includes the engaging portion 105a of the pinion 105 engageable with and disengageable from the engaging portion 104c of the spool shaft 104, a clutch cam 107a provided in the clutch operation element 107, a clutch plate 141 as well as, the kick gear 124, kick lever 142, switch-over element 108, and intermediate member 109.

As shown in FIGS. 18 to 21, the clutch operation element 107 includes two clutch cams 107a in the end face thereof, and projection portions 107b, 107c in the outer periphery thereof to which large and small pins 143 and 144 are fixed.

One end of the kick lever 142 is rotatably fitted with the pin 144.

A pin 145 is fixed to the other end of the kick lever 142, on the two sides of the other end of the kick lever 142, a guide metal fitting 146 and a margin pin 147 are mounted to the left side frame 101, and the other end of the kick lever 142 is arranged so as to face the kick gear 124.

The switch-over element 108, which is an L-shaped plate, includes a thumb operation portion 108a projected externally from the left side frame 101 and bent, and a connecting portion 108c having an elongated hole 108b opened up therein.

The switch-over element 108 is rotatably supported by a shaft portion 148 fixed to the left side frame 101, and a dead point spring 149 is interposed between the switch-over element 108 and the left side frame 101.

The intermediate member 109 includes a fan-shaped connecting portion 109a and an arm portion 109c having an elongated hole 109b opened up therein, and the intermediate member 109 is rotatably supported by a shaft portion 150 fixed to the left side frame 101.

A pin 151 is fixed to the connecting portion 109a of the intermediate member 109 and is also inserted into the elongated hole formed in the switch-over element 108.

The pin 143 of the clutch operation element 107 is inserted into the elongated hole 109b formed in the arm portion 109c.

The thumb operation portion 108a of the switch-over element 108, as shown in FIGS. 15 and 17, is disposed at a position where the tip of the thumb of one hand or the hand holding the reel can be put the thumb operation portion 108a when the whole reel is held in and by one hand.

As shown in FIGS. 16A and 16B, a shaft cylinder portion 101h is projectingly formed in the support plate 101", and the bearing 114 is mounted to a recessed portion formed inside the shaft cylinder portion 101h.

A shaft cylinder portion 103a is projectingly formed in the inside of the reel side plate 103, and the bearing 115 is fitted with and mounted to a recessed portion formed inside the shaft cylinder portion 103a, while a thrust bearing is fixed to the inside bottom surface of the shaft cylinder 103a and the other end 104d of the spool shaft 104 is in contact with the thrust bearing.

A gear 152 is fitted in a rotation preventive manner with the outer periphery of the other end 104d of the spool shaft 104 projected from the support plate 101" toward the reel side plate 103, while the gear 152 is prevented against slippage by an E ring 153.

A level wind device C is disposed between the right and left side frames 101 and 101' and in front of the spool 111 on the fishline play-out direction side, and a gear 155 is mounted to one end of a traverse cam shaft 154 of the level wind device C.

A gear 157 journaled on a shaft 156 provided in the support plate 101" is interposed between and in mesh with the gears 152 and 155.

The level wind device C, as shown in FIGS. 15 and 17, includes a guide cylinder 158, a fishline guide member 159 which is slidable right and left along the outer periphery of the guide cylinder 158, the above-mentioned traverse cam shaft 154 fixed to the two ends of the guide cylinder 158 and journaled by a bearing (not shown), an engaging member 160 stored in the fishline guide member 159 and engageable with a traverse groove formed in the traverse cam shaft 154, a cap 161 for holding the engaging member 160 in a slippage preventive manner, and a guide rod 162 for holding the fishline guide member 159 in parallel with the guide cylinder 158.

A hard fishline guide ring 163 is fixed to the fishline guide member 159, while a fishline 164 is inserted through the hard fishline guide ring 163 before it is wound around the spool 111.

The traverse cam shaft 154 can be rotated in linking with the rotation of the spool shaft 104.

Alternatively, the traverse cam shaft 154 may be structured such that it can be rotated in linking with the rotation of the handle shaft 106.

The two ends of the clutch plate 141 are respectively fitted with two support members 165 and 165 respectively fixed to the left side frame 101 and are energized by a spring (not shown) in a direction where the engaging portion 104c of the spool shaft 104 and the engaging portion 105a of the pinion 105 are engaged with each other.

The clutch plate 141 includes in the central portion thereof an arc-shaped recessed portion which can be fitted with the groove 105b formed in the pinion 105.

As shown in FIG. 23, the reel side plate 103 includes in the outer side surface thereof recessed grooves 103b and 103c respectively formed at positions where fingers can be applied when the whole reel is held within one hand, and the reel side plate 103 also includes a stepped portion 103d in the upper portion thereof.

Referring to the operation of the present fishing reel of a double bearing type, in the clutch-on state in which the thumb operation portion 108a of the switch-over element 108 is held at the solid line position in FIGS. 15 and 17, and the engaging portion 104c of the spool shaft 104 is in engagement with the engaging portion 105a of the pinion 105 as shown in FIG. 18, if the handle 117 is rotated counterclockwise in FIGS. 17 and 19, then the pinion 105 is rotated through the drive gear 116 due to the rotation of the handle shaft 106, so that the fishline 164 can be wound around the spool 111.

When adjusting the brake force of the drive gear 116 frictionally connected to the handle shaft 106 through the drag mechanism, the drag adjusting knob 135 may be rotated.

If the drag adjusting knob 135 is rotated, then the nut 133 is advanced or retreated to push against the collar 123, and the brake plates 127, 129 are pushed by the drive gear 116 through the springs 131, 131 and pressure disk 130, as well as through the respective friction plates, so that the brake force of the drive gear 116 can be adjusted.

If the handle 117 is rotated, then the drive gear 116 is rotated counterclockwise due to the preset brake force and, at the same time, the kick gear 124 and ratchet wheel 125 are rotated counterclockwise.

If the ratchet wheel 125 is rotated counterclockwise, then the spring plates 138, 138 and reversal preventive securing claw 139 are rotated clockwise due to the friction between the ratchet wheel 125 and spring plates 138, 138 to thereby disengage the leading end of the reversal preventive securing claw 139 from the securing teeth of the ratchet wheel 125, so that the ratchet wheel 125 can be rotated integrally with the drive gear 116.

Next, if the spool 101 is rotated reversely due to the play-out of the fishline 164, then the drive gear 116 and ratchet wheel 125 are rotated clockwise and the spring plates 138, 138 and reversal preventive claw 139 are rotated clockwise, so the leading end of the reversal preventive securing claw 139 is secured to the securing teeth of the ratchet wheel 135.

This securing stops the rotation of the handle shaft 106 and, therefore, the drive gear 116 can be rotated against the preset brake force.

Then, if the thumb operation portion 108a of the switch-over element 108 is rotated counterclockwise as shown in FIG. 22, then it takes a position shown by a two-dot chained line in FIGS. 15 and 17, the connecting portion 108c of the switch-over element 108 is rotated, the intermediate member 109 is rotated counterclockwise, and the clutch operation element 107 is rotated clockwise.

Due to this rotation, the clutch plate 141 is lifted up by the clutch cam 107a to remove the engagement between the engaging portion 105a of the pinion 105 and the engaging portion 104c of the spool shaft 104 to thereby turn the clutch mechanism into its clutch-off state, so that the spool 11 can be rotated freely.

When the clutch operation element 107 is rotated, then the kick lever 142 is advanced in the right direction in FIG. 22 and the pin 145 of the kick lever 142 is set at a position where it is contactable with the kick projection of the kick gear 124.

Next, if the handle 117 is rotated in the fishline take-up direction, then the ratchet wheel 125 and drive gear 116 are rotated counterclockwise in FIG. 22, the kick projection of the kick gear 124 is contacted with the pin 145 of the kick lever 142 to thereby push back the kick lever 142 in the right and left direction, the clutch operation element 107 is rotated or retreated counterclockwise, the engagement between the clutch cam 107a and clutch plate 141 is removed, and the engaging portion 105a of the pinion 105 is engaged with the engaging portion 104c of the spool shaft 104, thereby turning the clutch mechanism into the clutch-on state shown in FIGS. 18 and 19.

In the clutch-on state, if the handle 117 is rotated clockwise, then the pinion 105 and spool shaft 104 are rotated to thereby rotate the spool 111, the fishline guide member 159 of the level wind device C is slid right and left along the outer periphery of the guide cylinder 158, and the fishline 164 is wound parallel around the spool 111.

With use of the present fishing reel of a double bearing type structured in the above-mentioned manner, (1) the thumb operation portion 108a of the switch-over element 108 is situated at a position where the tip of the thumb can be put on the thumb operation portion 108a when the whole reel is held in one hand and, therefore, the thumb operation portion 108a can be operated or shifted with the one hand holding the whole reel;

(2) since the thumb can be placed on the flange outer periphery of the spool 111 after the thumb operation portion 108a is operated or shifted, the thumbing operation allowable state can be obtained immediately after the clutch mechanism is turned into the clutch-off state;

(3) while the handle 117 is being held by the other hand, the reel can be operated;

(4) in fighting against a fish, with the whole reel held in one hand, the switching operation of the switch-over element 108 as well as the thumbing operation can be performed with the one hand, while the handle 117 can be operated by the other hand, thereby eliminating the need to move or shift any of the two hands;

(5) the recessed grooves 103b and 103c as well as stepped portion 103d are formed in the outside surface of the reel side plate 103, in particular, at the positions thereof where fingers can be applied when the whole reel is held in one hand and, therefore, the position of the hand holding the whole reel can be determined;

(6) since the handle 117 is situated nearer to the body of an angler, when performing the handle operation, the arm and side of the angler's body can be closed tight to thereby be able to not only perform the fishline take-up operation smoothly and stably but only reduce the oscillation of the reel;

(7) since the adjusting knob 118 for pressure contact with the end portion of the spool shaft 104 is situated in front of the handle 117, the adjusting operation of the adjusting knob 118 can be performed easily;

(8) since the handle 117 for take-up operation is mounted on the portion of the reel side plate 102 that is disposed in the rear of the spool shaft 104, the center of gravity of the reel and the mounting position of the handle 117 are nearer to the position of the hand holding the reel and, therefore, in casting, even if the spool 111 is operated while the reel is being held in the thumbing operation allowable state, not only the reel is easy to hold but also the fishing rod and reel are easy to swing;

(9) because the level wind device C is disposed in front of the spool shaft 104 and the handle shaft 106 is disposed in the rear of the spool shaft 104, that is, they are disposed separately from each other, not only the drive portion can be mounted onto the reel main body A in a well-balanced manner but also the whole reel can be improved in balance; and, Also, since the traverse cam shaft 154, handle shaft 106, and spool shaft 104 are not disposed collectively, the reel is improved in manufacturing, assembling, dismantling, and maintenance or repairing.

Figure 24:
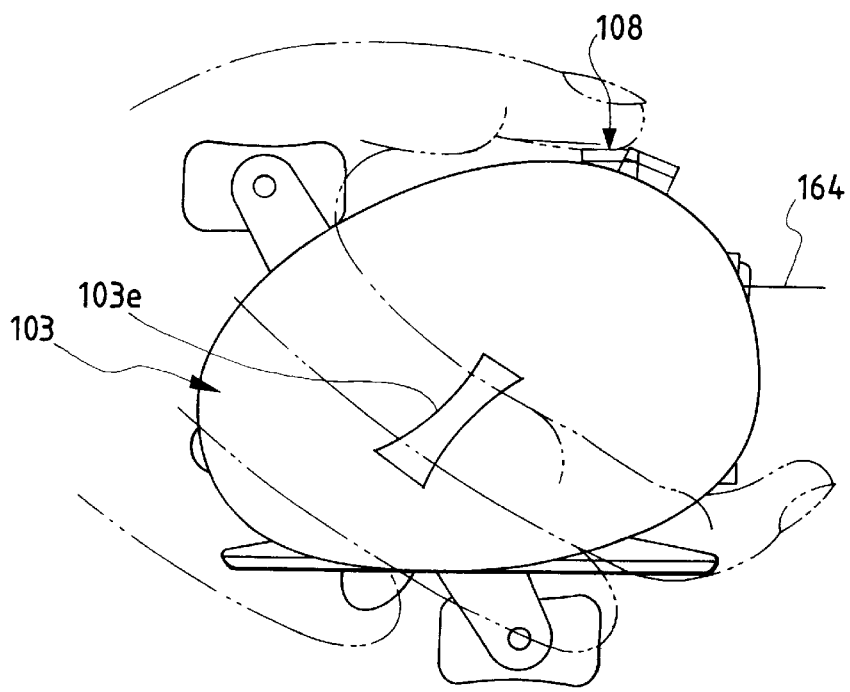
FIG. 24 is a side view of a modification of the right reel side plate employed in the fishing reel of a double bearing type.
Figure 25:
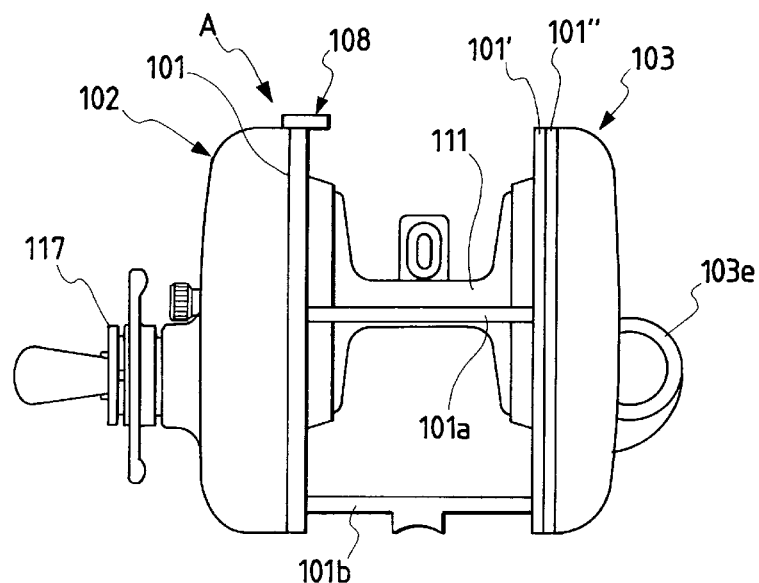
FIG. 25 is a back view of the fishing reel of a double bearing type.

Now, in FIGS. 24 and 25, there is shown a fishing reel of a double bearing type according to a fourth embodiment of the present invention, in which a right reel side plate thereof is modified. In particular, FIG. 24 is a side view of the fishing reel of a double bearing type on the right reel side plate side thereof, and FIG. 25 is a back view of the present fishing reel of a double bearing type.

The fourth embodiment is made by applying the following modification to the third embodiment.

The reel side plate 103 includes on the outer side surface thereof a ring 103e through which a finger can be inserted when the whole reel is held in one hand.

If the finger insertable ring 103e is provided, then the reel can be held fast.

Although the foregoing description has been given assuming that the present invention is applied to the left-hand reel, the same operation and effect can be obtained even when the invention is applied to the right-hand reel.

Also, in the foregoing description, although the reel main body A is structured such that the two right and left side frames 101, 101', support plate 101a and fixing plate 101b are formed integral with one another, alternatively, these elements may be formed separately from one another and the right and left side frames 101 and 101' may be held parallel to each other.

Now, description will be given below in detail of a double bearing type fishing reel with a fishline parallel winding device according to a fifth embodiment of the invention.

Figure 27:
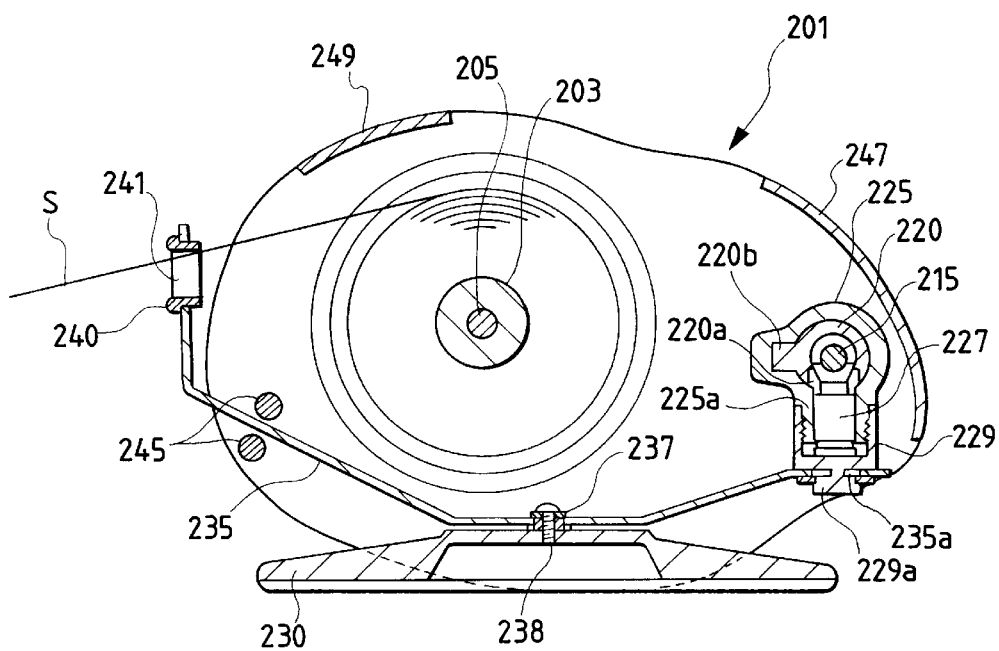
FIG. 27 is a section view taken along the line 27—27 shown in FIG. 26.
Figure 26:
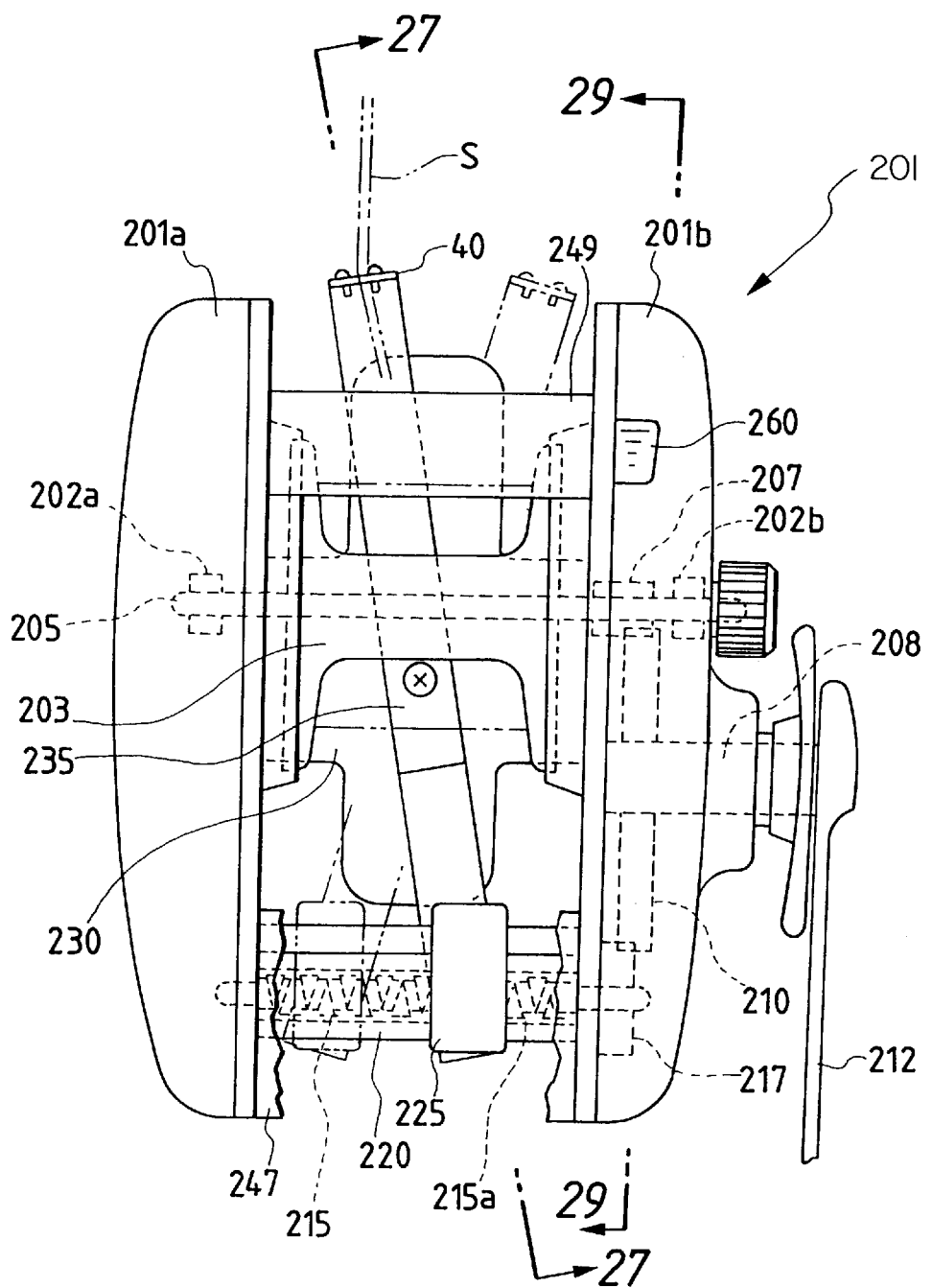
FIG. 26 is a plan view of the structure of a double bearing type reel which incorporates therein a fishline parallel winding device, which constitutes a fifth embodiment of the invention.
Figure 28:
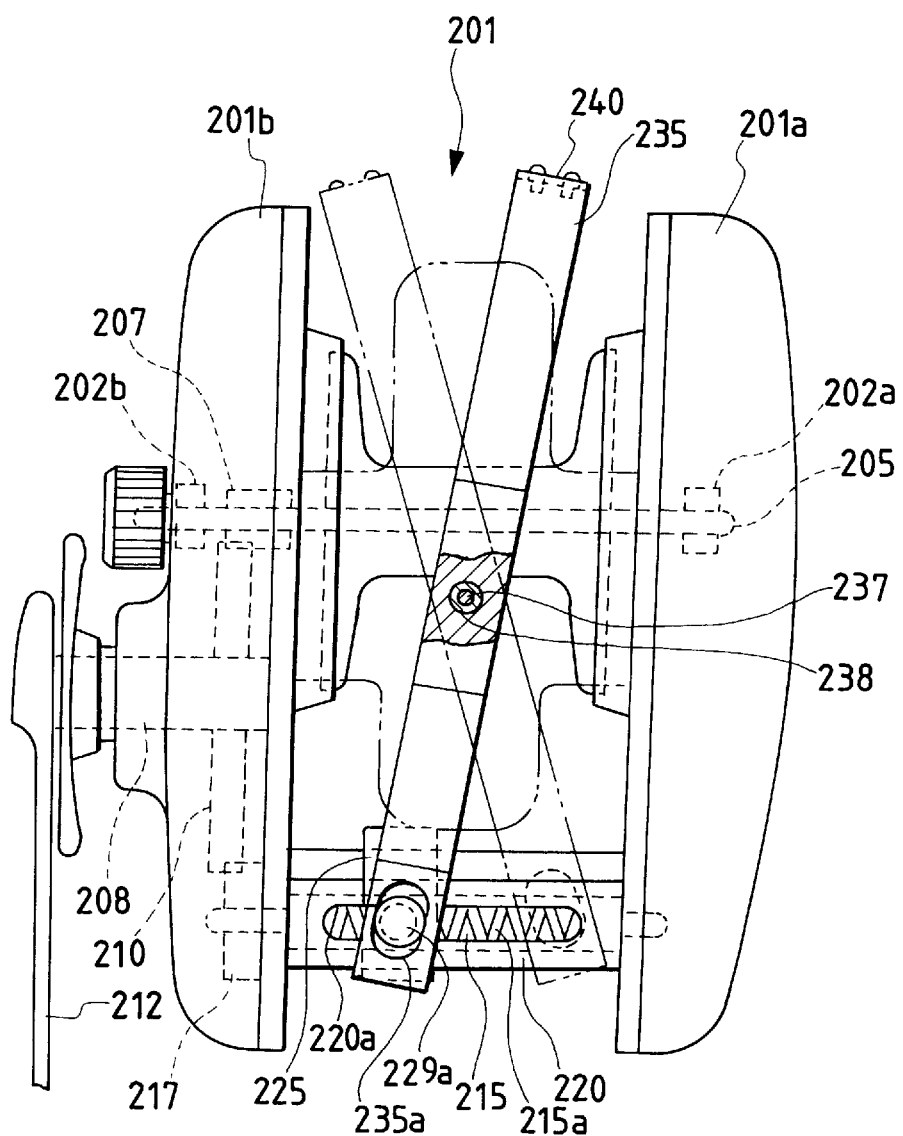
FIG. 28 is a back view of the double bearing type reel shown in FIG. 26.

FIG. 26 is a plan view of a reel of a double bearing type which incorporates therein a fishline parallel winding device, which constitutes a fifth embodiment of the present invention, FIG. 27 is a section view taken along the line 27—27 shown in FIG. 26, and FIG. 28 is a back view of the reel shown in FIG. 26.

Between the right and left side plates 201a and 201b of a reel main body 201, there is rotatably supported a spool shaft 205 on which a spool 203 is mounted by means of two bearings 202a and 202b. On the end portion of the spool shaft 205, there is mounted a pinion 207 which is in mesh with a drive gear 210 mounted on a handle shaft 208. Due to this structure, if a handle 212 is rotatively operated, then the spool 205 can be rotatively driven. And, since the handle shaft 208 includes an anti-reversal mechanism (not shown), the handle 212 can be rotatively operated only in the fishline winding direction. Also, a clutch mechanism (which will be discussed later) is provided in the side plate 201b and, if a clutch lever 260 is operated, then the spool 203 can be freely rotated in the fishline play-out direction.

Between the right and left side plates 201a and 201b of the spool 203 respectively disposed on the fishline play-out side and on the opposite side thereof, there is rotatably supported a traverse shaft 215 which includes a traverse groove 215a formed in the outer peripheral surface thereof a gear 217 formed in the end portion thereof and meshable with the drive gear 210. The traverse shaft 215 is stored within a guide cylinder 220, which is mounted between the right and left side plates 201a and 201b and includes an elongated hole 220a formed on the lower side thereof and extending in the axial direction of the guide cylinder 220, in such a manner that the traverse shaft 215 can be rotatively driven within the guide cylinder 220.

The guide cylinder 220 includes on the outer peripheral surface thereof a projecting portion 220b which extends along the axial direction of the guide cylinder 220, while there is disposed a drive element 225 in such a manner that it encloses the outer peripheral surface and projecting portion 220b of the guide cylinder 220. In this case, the projecting portion 220b performs a rotation preventive function to prevent the drive element 225 against rotation when the drive element 225 reciprocates along the guide cylinder 220. The drive element 225 includes in the lower portion thereof a storage portion 225a in which there is stored an engaging member 227 engageable with the traverse groove 215a through the elongated hole 220a formed in the guide cylinder 220. In the outer peripheral surface of the storage portion 225a there is formed a screw groove on which a bag nut 229 is mounted. The bag nut 229 includes a downwardly extending connecting portion 229a which is in engagement with an operation element (which will be discussed later) in such a manner that it is prevented from slipping off the operation element.

Between the right and left side plates 201a and 201b existing in the lower portion of the spool 203, there is disposed a rod mounting portion 230 which is used to mount the reel main body 201 onto a rod. As shown in FIG. 27, the central portion of a bent plate-shaped operation element 235 is journaled on the surface of the rod mounting portion 230 by a collar 237 and a support shaft 238 disposed within the collar 237, while the operation element 235 can be rotated about the journaled portion thereof (see FIG. 28). In one end of the operation element 235, there is formed an elongated hole 235a into which the connecting portion 229a of the bag nut 229 can be inserted in such a manner that it is prevented from slipping off the elongated hole 235a, and, in the outer end thereof, there is provided a fishline guide element 240 including therein a fishline guide hole 241 through which a fishline S wound around the spool 203 can be inserted.

In the above-mentioned structure, description will be given below of a fishline take-up operation, that is, an operation to turn the handle 212 to thereby wind the fishline around the spool.

The spool 203 is rotatively driven so that the fishline can be wound around the spool 203 through the drive gear 210 and pinion 207. Also, the traverse shaft 215 is rotated through the gear 217 by means of the rotation of the drive gear 210. Since the engaging member 227 is in engagement with the traverse groove 215a, if the traverse shaft 15 is rotated, then the drive element 225 including the engaging member 227 reciprocates along the guide cylinder 220. In this case, the drive element 225 reciprocates along the guide cylinder 220 in such a manner that it is prevented against rotation by the projecting portion 220b formed in the guide cylinder 220. With the reciprocating sliding motion of the drive element 225, the operation element 235 is driven in such a manner that it is rotated about the support shaft 238 and between the two side plates 201a and 201b. Although the leading end portion of the operation element 235 is going to move in an arc-like manner, the operation element 235 is forced to reciprocate along the traverse shaft 215 because the connecting portion 229a moves within the elongated hole 235a formed in the operation element 235.

Since the operation element 235 is rotated about the support shaft 238, the fishline guide element 240 is reciprocated right and left in front of the spool 203. For this reason, when winding the fishline S around the spool 203, the fishline guide element 240 is reciprocated along the spool 203 in front of the spool 203, so that the fishline S can be wound around the spool 203 uniformly.

Here, to rotate the operation element 235 stably, preferably, for example, as shown in FIG. 27, between the right and left side plates 201a and 201b, there may be interposed guide members in such a manner that they hold the operation element 235 between them. Such guide members may be provided at two or more positions or may be provided on the rear side of the spool 203.

Also, between the right and left side plates 201a and 201b, in order to prevent the reciprocating movement of the drive element 225 from interfering the actual fishline take-up operation, there is provided a cover 247 above the drive element 225. In order to perform the maintenance operation of the above-mentioned sliding drive portion with ease, preferably, the cover 247 may be structured in such a manner that it can be freely mounted on and removed from the right and left side plates 201a and 201b or it can be freely opened and closed with respect to the right and left side plates 201a and 201b. Here, since the fishline guide element 240 disposed in front of the spool 203 is also reciprocated, similarly, there is provided a cover 249 above the fishline guide element 240. In the embodiment shown in FIG. 27, the fishline guide element 240 is situated in front of the cover 249 but, however, the shape of the operation element 235 as well as the position and shape of the cover 249 can be changed variously so that the cover 249 is able to cover the whole of the fishline guide element 240.

Figure 29:
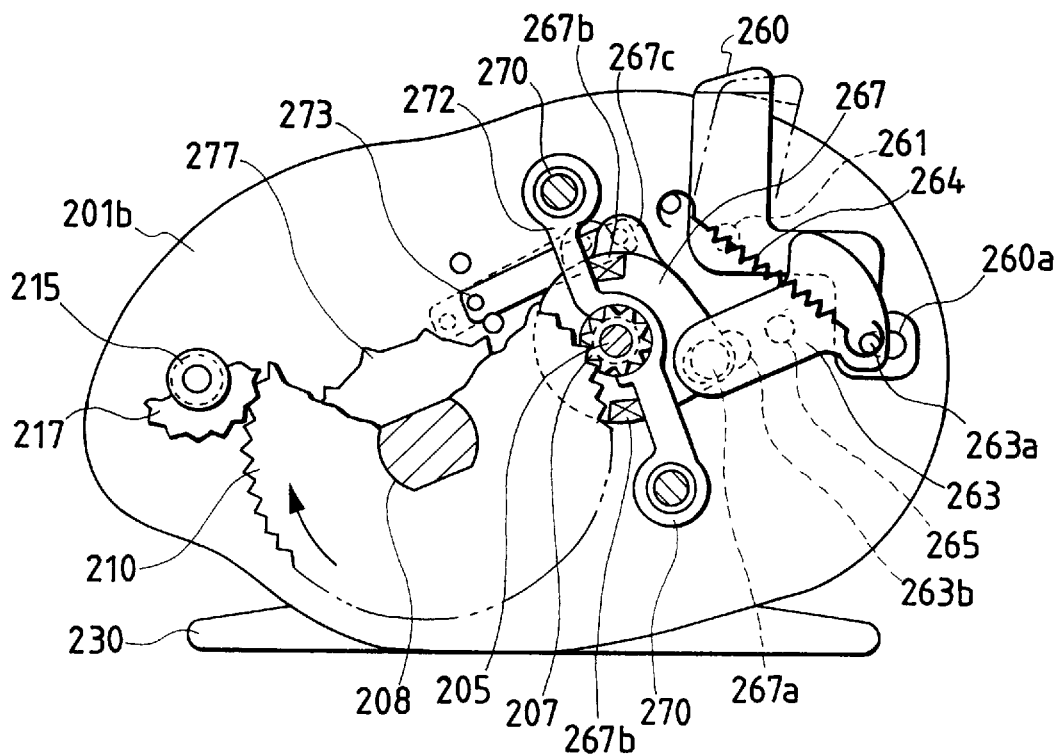
FIG. 29 is a section view taken along the line 29—29 shown in FIG. 26.

Next, description will be given below of the structure of the clutch mechanism which is used to rotate the spool 203 freely in the fishline play-out direction with reference to FIG. 29. In particular, FIG. 29 is a section view taken along the line 29—29 shown in FIG. 26, showing the structure of the clutch mechanism. A clutch lever 260 shown in FIG. 26 is formed in a stepped shape as shown in FIG. 29 and is rotatably supported on the side plate 1b by a support shaft 261. The clutch lever 260 includes in the leading end portion thereof an elongated hole 260a into which there is inserted an engaging projection portion 263a formed in an operation element 263 supported rotatably on the side plate 201b by a support shaft 265. To the engaging projection portion 263a, there is secured the other end of a divisional spring 264 with one end thereof mounted on the side plate 201b, so that the on/off portion of the clutch lever 260 can be held divisionally. On the opposite side of the operation element 263 to the engaging projection portion 263a, there is formed an elongated hole 263b into which there is inserted an engaging projection portion 267a formed in a rotary cam 267 which is supported rotatably on the spool shaft 205.

The pinion 207 is mounted slidably along the spool shaft 205 in such a manner to be able to take a position where it can be engaged with the spool shaft 205 and can be rotated integrally therewith as well as to take a position where it can be disengaged from the spool shaft 205 and can be rotated freely with respect to the spool shaft 205. The pinion 207 includes a clutch plate 272 which is journaled in the leading ends of the two arm portion thereof. The clutch plate 272 is normally energized by two springs 270 respectively provided in the leading ends of the two arm portions thereof such that the clutch plate 272 is kept in contact with the surface of the rotary cam 267. The rotary cam 267 includes in the peripheral end portions thereof two cam surfaces 267b which are respectively formed in an inclined surface and are engageable with the two arm portions of the clutch plate 272. If the rotary cam 267 is rotated counterclockwise from a position shown in FIG. 29, then the clutch plate 272 is lifted up against the energizing force of the spring 270 due to the inclination of the cam surfaces 267b. And, if the clutch plate 272 is lifted up, then the pinion 207 is slid to a position in which it can be rotated freely with respect to the spool shaft 205.

The rotary cam 267 includes in the outer peripheral portion thereof a projection portion 267c on which the base end portion of a returning plate 273 is mounted. The leading end portion of the returning plate 273 is engageable with a returning gear 277 which can be rotated integrally with the handle shaft 208 when the rotary cam 267 is rotated counterclockwise.

Next, description will be given below of the operation of the clutch mechanism structured in the above manner.

The state of the clutch mechanism shown by solid lines in FIG. 29 illustrates the on state of the clutch. In this state, if the handle shaft 208 is rotated in a fishline take-out direction shown by an arrow line, then the drive force is transmitted through the pinion 207 to the spool shaft 205 and thus the spool is rotatively driven in the fishline winding direction. From this state, if the clutch lever 260 is operated in a manner shown by a two-dot chained line, then the clutch lever 260 is rotated clockwise about the support shaft 261, with the result that the operation element 263 is also rotated clockwise about the support shaft 265. If the operation element 263 is rotated clockwise, then the rotary cam 267 is rotated counterclockwise and thus, due to the cam surfaces 267b, the clutch plate 272 is lifted up against energizing force of the spring 270. If the clutch plate 272 is lifted up, then the pinion 207 is slid to the position where it can be rotated freely with respect to the spool shaft 205, thereby removing the engagement between the pinion 207 and spool shaft 205. This allows the spool shaft 205 to be rotated freely in the fishline play-out direction. This state is kept by the divisional spring 264. Also, in this state, the leading end of the returning plate 273 is in engagement with the returning gear 277.

While the clutch lever 260 is in the above-mentioned off state, if the handle shaft is rotated in the fishline take-up direction, then the returning gear 277 pushes back the returning plate 273 to thereby rotate the rotary cam 267 clockwise. Due to this clockwise rotation of the rotary cam 267, the clutch plate 272 is brought into contact with the surface of the rotary cam 267 by means of the energizing force of the spring 270, thereby returning the pinion 207 to the position where it can be engaged with the spool shaft 205 and can be rotated integrally with the spool shaft 205. As a result of this, the clutch lever 260 is rotated to the position shown by the solid line and is retained in this position by the divisional spring 264. That is, if the handle is operated in the fishline winding direction, then the clutch-on state can be obtained again.

Of course, the above-mentioned clutch mechanism is just one example and the structure of the clutch mechanism can be changed in various manners.

Figure 30:
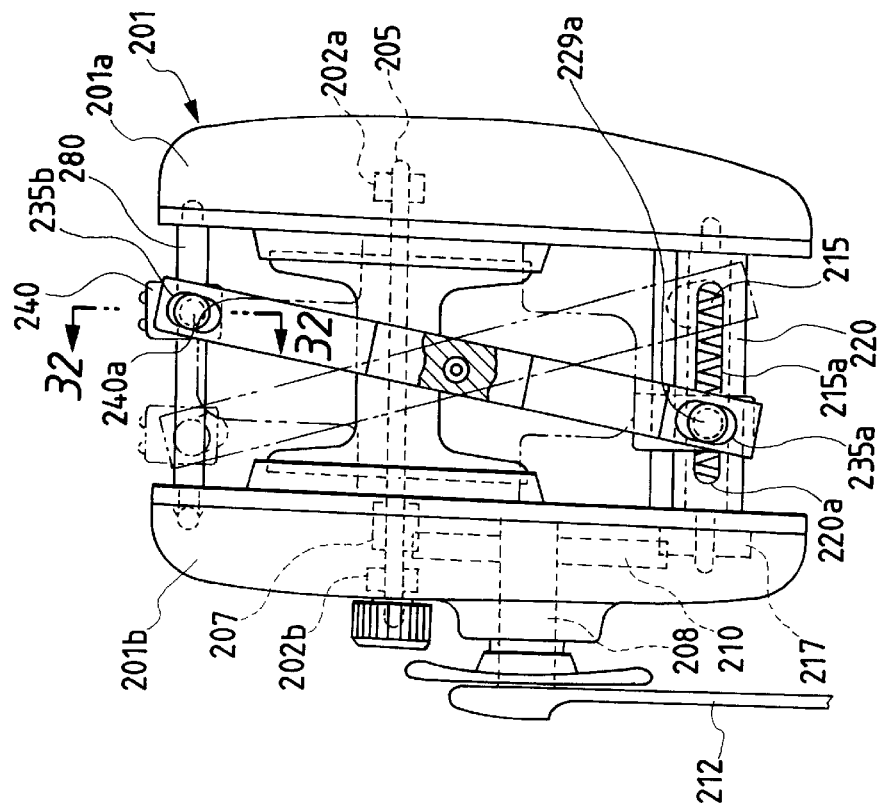
FIG. 30 is a view of a modification of the fishline parallel winding device according to the invention.

Next, description will be given below of a modification of a fishline parallel winding device according to the fifth embodiment of the invention with reference to FIG. 30. In this modification, when compared with the fifth embodiment shown in FIG. 26, the handle shaft 208 is disposed in front of the spool shaft 205 and the clutch lever 260 of the clutch mechanism is disposed in the rear of the spool shaft 205. And, the transmission of the drive force to the traverse shaft 215 is carried out from the opposite side plate 201a through a gear 216a mounted on the opposite side of the spool shaft 205 and a gear 216b meshable with the gear 216a.

The above-mentioned arrangement of the handle shaft and clutch lever in this modification is conventionally known well and the fishline parallel winding device according to the invention is provided in the thus structured reel of a double bearing type. That is, the present invention is characterized in that the fishline guide member of the fishline parallel winding device and the reciprocative drive portion for reciprocating the fishline guide member are provided in the front and rear portion of the spool separately from each other and are then connected together. And, the positions of the handle shaft and clutch lever are not limited to the illustrated structure but they can be changed in various manners.

Figure 32:
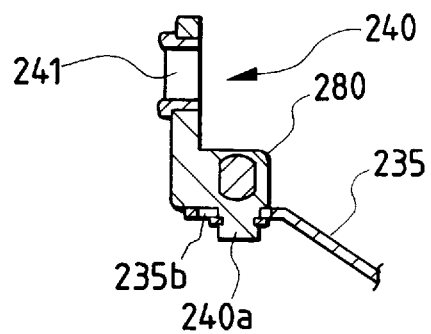
FIG. 32 is a section view taken along the line 32—32 shown in FIG. 31.
Figure 31:
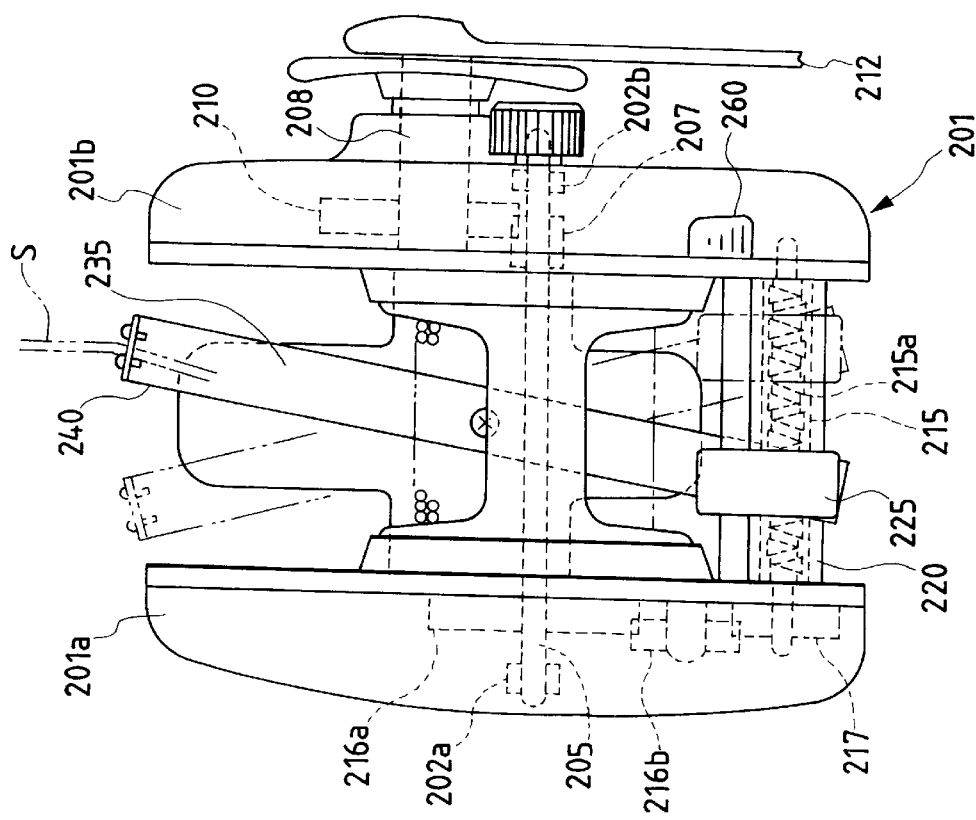
FIG. 31 is a back view of a double bearing type reel which incorporates therein a fishline parallel winding device, which constitutes a sixth embodiment of the invention.

Now, in FIGS. 31 and 32, there is shown a sixth embodiment of a fishline parallel winding device according to the invention. In particular, FIG. 31 is a back view of a double bearing type reel which incorporates therein a fishline parallel winding device according to the sixth embodiment of the invention, and FIG. 32 is a section view taken along the line 32—32 shown in FIG. 31.

In the sixth embodiment, a fishline guide element 240, which is disposed on the fishline play-out side of the spool 203, is supported on a guide rod 280 which is provided between the right and left side plates 201a and 201b. The guide rod 280, as shown in FIGS. 31 and 32, is formed in an elliptic shape and, due to this, the fishline guide element 240 is supported on the guide rod 280 in such a manner that it is prevented against rotation and is freely slidable in the axial direction. The fishline guide element 240 includes in the lower portion thereof a connecting portion 240a which is inserted into an elongated hole 235b formed in the end portion of the operation element 235 in such a manner that the connecting portion 240a is prevented against slippage off the hole 235b. The remaining portions of the structure of the sixth embodiment are similar to those of the structure shown in FIGS. 26 or 30.

According to the present structure, since the fishline guide element 240 is reciprocated in such a manner that it is always parallel to the spool 203, the fishline can be wound uniformly around the spool 203 more stably. Also, the operation element 235 is supported in the two end portions thereof and, therefore, the rotational operation thereof can be stabilized. Of course, in the sixth embodiment as well, the guide element 245 shown in FIG. 27 may be interposed between the right and left side plates 201a and 201b.

Figure 33:
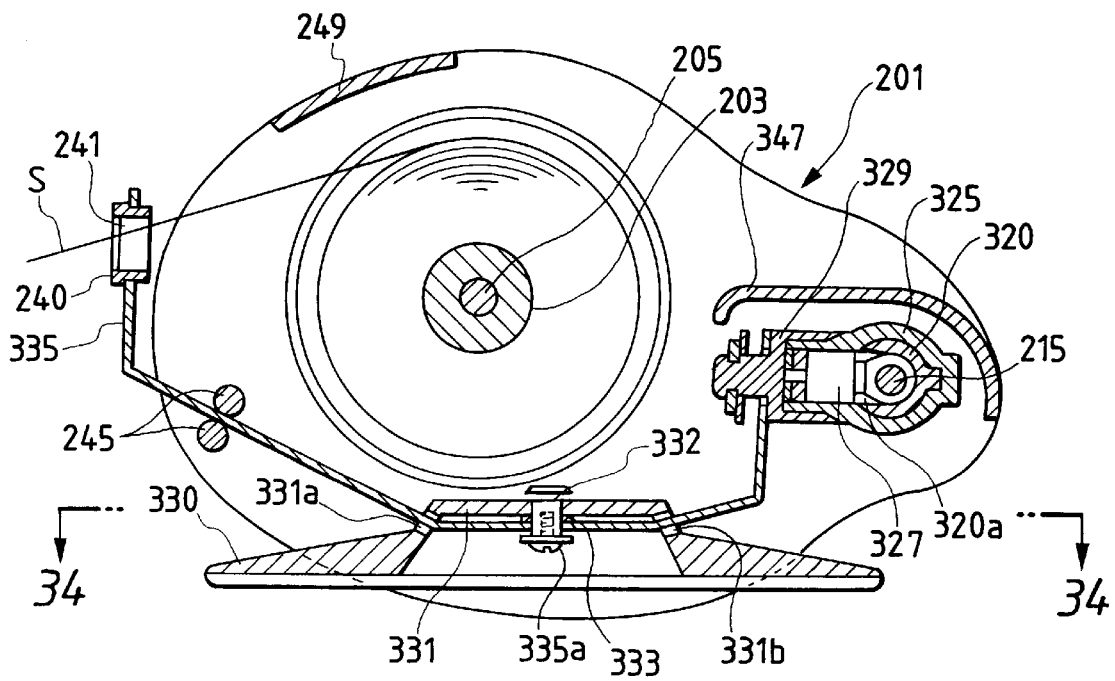
FIG. 33, similarly to FIG. 27, is a longitudinal section view of a seventh embodiment of a fishline parallel winding device according to the invention.
Figure 34:
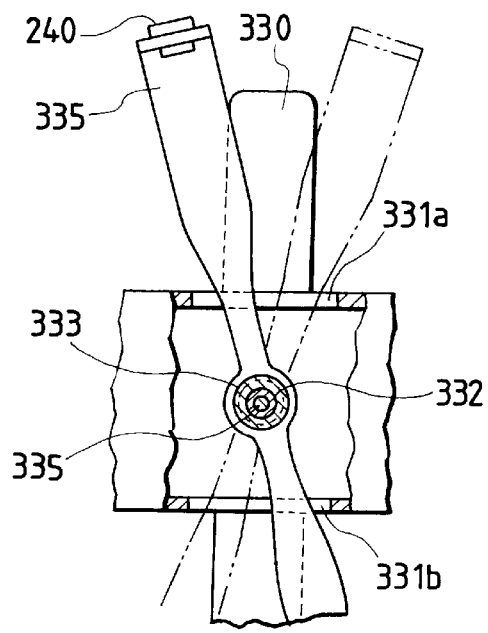
FIG. 34 is a section view taken along the line 34—34 shown in FIG. 33.

Now, in FIGS. 33 and 34, there is shown a seventh embodiment of a fishline parallel winding device according to the invention. In particular, FIG. 33 is a longitudinal section view of a reel of a double bearing type, and FIG. 34 is a section view taken along the line 34—34 shown in FIG. 33. The seventh embodiment is characterized by the support portion of an operation element as well as by the drive side end portion of the operation element.

A rod mounting portion 330, which supports or journals an operation element 335 in a rotatable manner, includes a projecting portion 331 in the central portion thereof. The journaled portion or central portion of the operation element 335 is journaled from the back surface side of the projection portion 331 between the cylindrical element 332, which is disposed on the back surface side of the projection portion 331 and is prevented against removal or slippage by the upper surface of the projecting portion 331, and the back surface of the projecting portion 331 through a washer 333 and a screw 335a. In order that the operation element 335 can be rotated about the journaled portion thereof, in the front and rear wall portions of the projecting portion 331, there are respectively formed cutaway portions 331a and 331b through which the operation element 335 can be inserted. By supporting the operation element 335 on the back surface side of the rod mounting portion 330 in this manner, the exposed portion of the device can be reduced, which not only prevents the fishline from getting entangled but also improves the appearance of the device and thus the reel. Of course, the present structure employed in the rod mounting portion can also be used in the previously described embodiments.

Also, in the present embodiment, the elongated hole 320a of a guide cylinder 320 is opened on the spool (203) side thereof and an engaging member 327 provided in a drive element 325 is arranged so as face the spool 203. Due to this, the operation element 335 is raised up vertically in the rear of the spool 203 side and a bag nut 329 provided in the drive element 325 is supported in a slippage preventive manner in the leading end portion of the vertically raised portion of the operation element 335. In this case, in order that the drive element 325 can be slid right and left and the leading end side of the operation element 335 can be moved (back and forth) in an arc manner, the bag nut 329 is extended toward the spool 203 side and the leading end portion of the operation element 335 is supported in the extended portion of the bag nut 329 in such a manner that it is prevented against slippage with some play in the back and forth direction. The whole top portion of the above-mentioned driving portion is covered with a cover 347 which is disposed over the driving portion. Since the driving portion is structured in a horizontal shape in this manner, the height of the driving portion can be controlled down to a low level, which improves the holdability of the reel and thus improves the fishing operationability of the reel further.

Figure 35A:
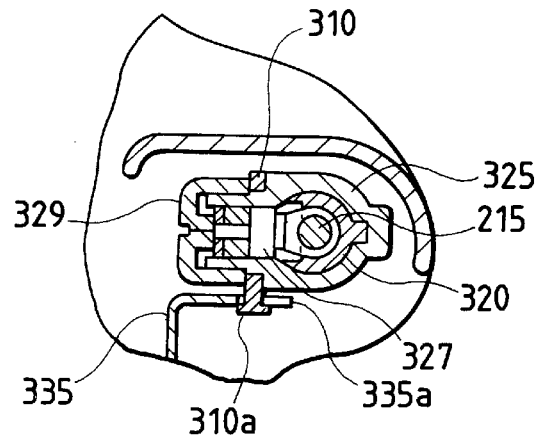
FIGS. 35A to 35C are respectively section views of modifications of the seventh embodiment, in which the driving portions thereof are structured in a horizontal shape.
Figure 35B:
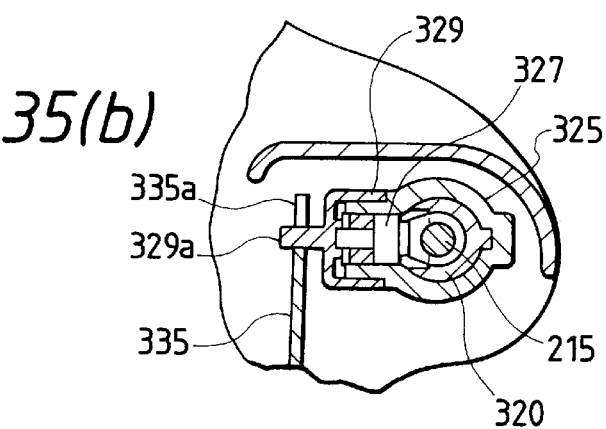
Figure 35C:
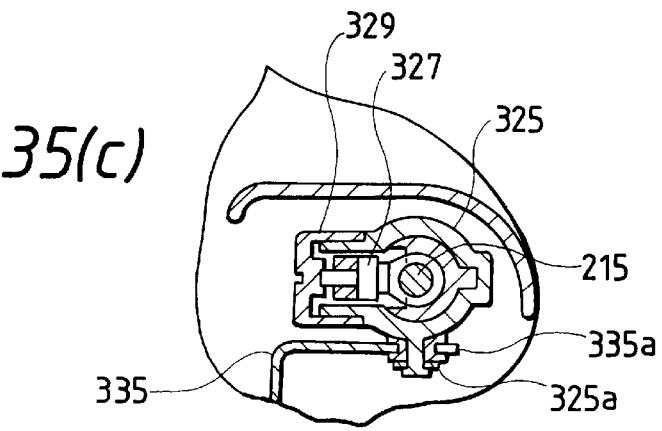

Now, FIGS. 35A to 35C respectively show the modified versions of the horizontal-shaped driving portion according to the third embodiment. In any one of the three modifications, the drive element 325 and operation element 335 are engaged with each other in such a manner that the operation element 335 can be moved back and forth when the drive element 325 is slid right and left.

In particular, in the modification shown in FIG. 35A, between the drive element 325 and bag nut 329, there is interposed a hold member 310 for fixing them to each other, while an engaging portion 310a formed projectingly on the lower side of the hold member 310 is supported by the operation element 335 in a slippage preventive manner. The leading end side of the operation element 335 is bent in a horizontal direction and a U-shaped cutaway portion 335a is formed in the leading end portion of the operation element 335. The lower side projecting portion of the hold member 310 is supported by the cutaway portion 335a in a slippage preventive manner and the operation element 335 can be moved back and forth.

Also, in the modification shown in FIG. 35B, the bag nut 329 includes an engaging portion 329a which projects out toward the spool (203) side. The engaging portion 329a is located in the U-shaped cutaway portion 335a formed in the leading end portion of the operation element 335, while the operation element 335 can be moved back and forth.

Further, in the modification shown in FIG. 35C, in the outer peripheral surface of the drive element 325, there is formed integrally therewith an engaging portion 325a which projects out downwardly, and the engaging portion 325a is supported in a slippage preventive manner by the operation element 335 having such a structure as shown in FIG. 35A. In this manner, according to the invention, the engaging portions of the driving portion and operation element can be changed in various manners. Also, although not shown, the driving portion can also be structured in an inclined manner, besides in the horizontal direction and in the vertical direction.

Figure 36:
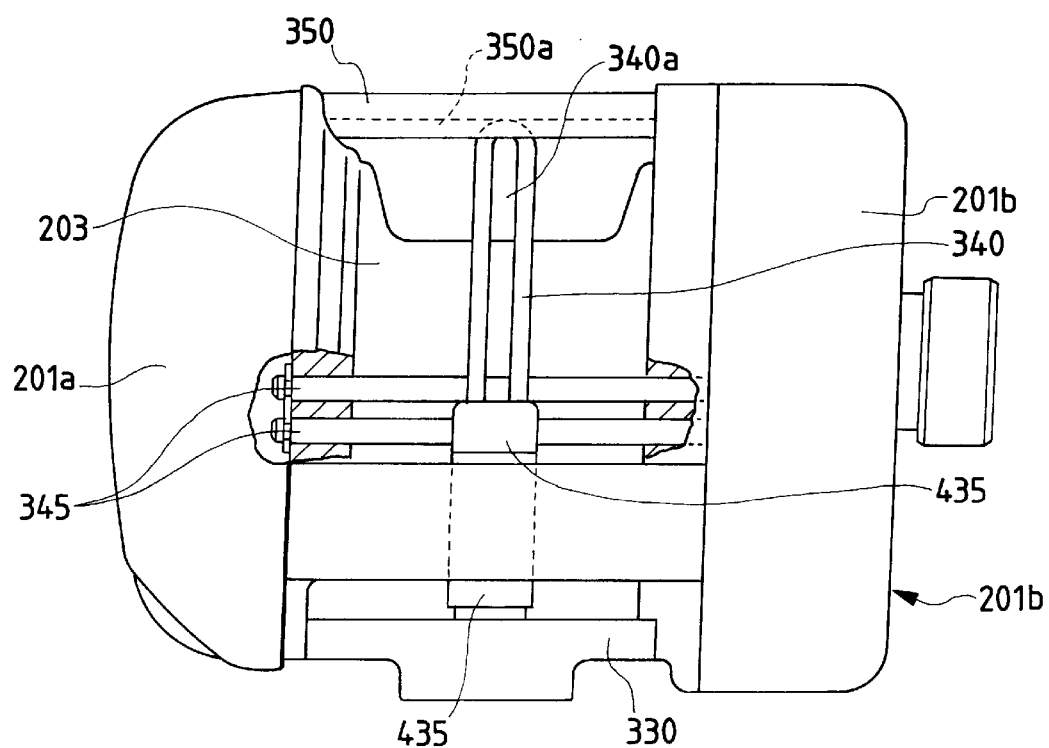
FIG. 36 is a view of a reel which incorporates therein an eighth embodiment of a fishline parallel winding device according to the invention, when the reel main body of the reel is viewed from front.
Figure 37:
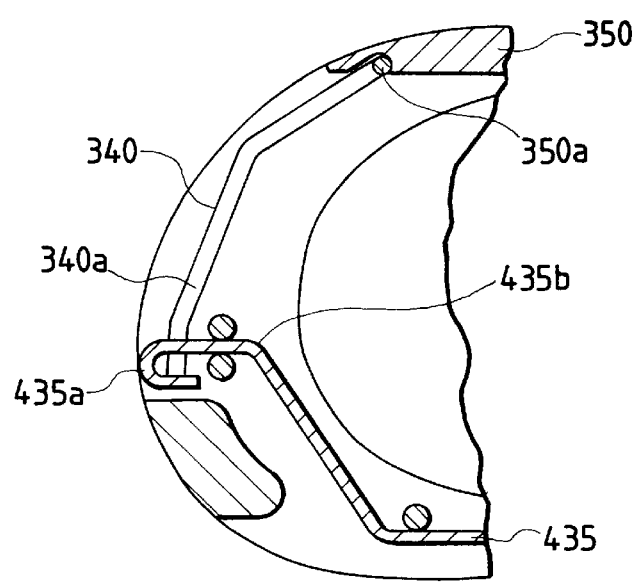
FIG. 37 is an enlarged longitudinal section view of the front portion of the reel shown in FIG. 36.
Figure 38:
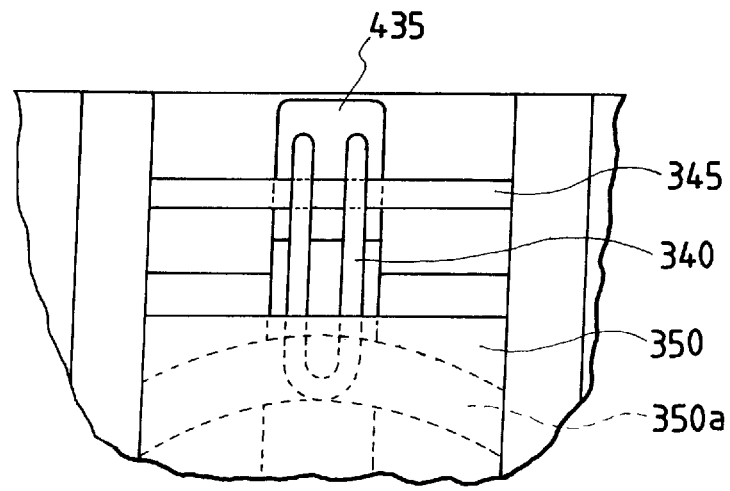
FIG. 38 is a top plan view of the front portion of the reel shown in FIG. 36.

Now, in FIGS. 36 to 38, there is shown an eighth embodiment of a fishline parallel winding device according to the invention. In particular, FIG. 36 is a front view of a reel main body, FIG. 37 is an enlarged longitudinal section view of a reel front portion, and FIG. 38 is a top plan view of the reel front portion. The fourth embodiment is characterized by a fishline guide member. An operation element 435 includes a front leading end side which is bent in a horizontal direction and is also folded in a U-shaped manner in the end portion thereof to thereby provide a U-shaped folded portion 435a. To the U-shaped folded portion 435a, there is connected a fishline guide member 340 including an elongated hole 340a through which the fishline can be inserted. The connection between the operation element 435 and the fishline guide member 340 can be achieved by staking, by bonding or by use of a retaining ring or the like in such a manner that they are prevented against slippage or removal. The end portion of the fishline guide member 340 on the opposite side thereof is slidably engaged with a support portion 350a formed in a support member 350 interposed between the right and left side plates 201a and 201b of the reel main body. In this case, the fishline guide member 340 draws an arc-shaped locus due to the rotation of the operation element 435 and, for this reason, the support portion 350a is structured in such an arc shape as shown in FIG. 38.

According to this structure, since a hole through which the fishline is inserted can be formed in such a manner that it extends in the longitudinal direction thereof, there is eliminated the possibility that the fishline can be rubbed against the hole and thus can be damaged. Also, because the portion of the operation element 435 with which the fishline can come into contact is folded in a curved surface (that is, the folded portion 435a), the fishline is prevented against damage. Further, as the fishline guide member 340 is slidably guided by the support member 350 even in the upper end portion thereof, the fishline guide member 340 can be rotated stably. In this case, if the horizontal portion 435b of the operation element 435 is structured such that it can be held by and between a pair of guide members 345 respectively interposed between the right and left side plates 201a and 201b of the reel main body, the leading end side of the operation element 435 can be rotated more stably.

Figure 39:
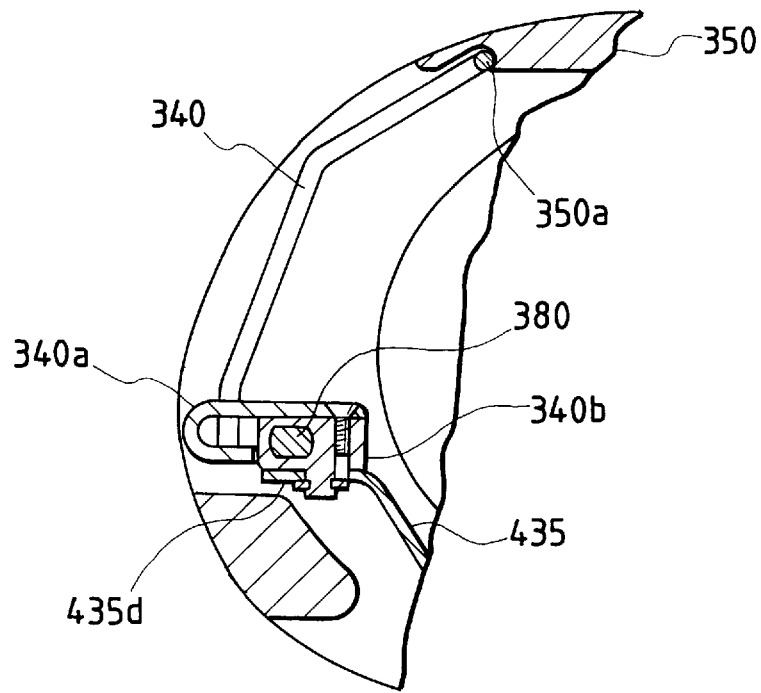
FIG. 39 is a section view of a modification of the embodiment shown in FIG. 36.

Now, in FIG. 39, there is shown a modification in which, similarly to the structure shown in FIG. 32, the fishline guide member 340 disposed on the fishline play-out side of the spool 203 is supported by a guide rod 380 interposed between the right and left side plates of the reel main body. The guide rod 380, as shown in FIG. 39, has an elliptic shape and, due to this, a folded portion 340a formed in the lower end portion of the fishline guide member 340 is prevented against rotation by the guide rod 380 and is supported slidably in the axial direction thereof. And, the folded portion 340a includes a connecting portion 340b which is inserted into an elongated hole 435b formed in the end portion of the operation element 435 in a slippage preventive manner. As a result of this, since the fishline guide member 340 is reciprocated always in parallel to the spool 203, the fishline can be wound uniformly around the spool 203 more stably. Also, as the operation element 435 is supported in the two end portions thereof, the rotational operation of the operation element 435 can be stabilized. Of course, the support portion 350a formed in the support member 350 is structured in a linear shape.

It should be noted here that the characteristic portion of the embodiments and modifications of the invention described above with reference to the accompanying drawings can be changed in various manner by combining them with one another properly.

As has been described heretofore, according to the fifth to eighth embodiments of the invention, since the fishline guide member and the sliding drive portion for reciprocating the fishline guide member are separated from each other and are disposed respectively in the front and rear portions of the spool, when the fishline containing a large amount of seawater, sand, dust and the like is guided to and wound around the spool, the seawater, sand, dust and the like can be prevented from adhering to the sliding drive portion, which allows the sliding drive portion to be operated always stably.

Also, due to the fact that the main elements of the fishline parallel winding device are disposed respectively in the front and rear portions of the reel, that is, separately from each other, the effective use of the space can be achieved, the front portion of the reel can be reduced in space and can be made compact in size, the whole reel can be improved in balance, and the center of gravity of the reel can be stabilized, which results in the improved fishing operationability of the reel.

Figure 40:
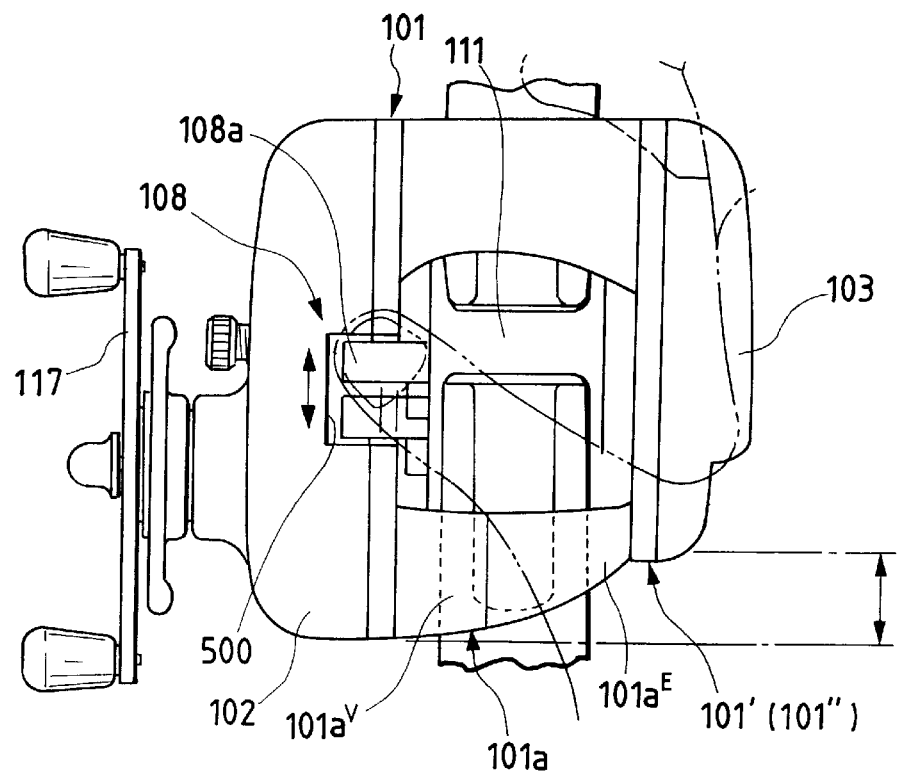
FIGS. 40 and 41 are a plan view and a rear view of a modification of the third embodiment.
Figure 41:
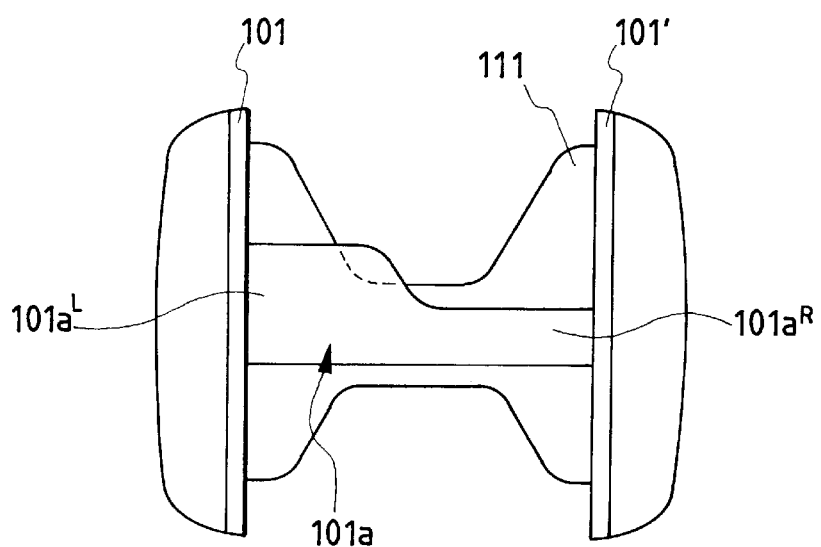

In addition, the right and left side frames may be formed to have different configurations in each of the embodiments. For example, the right side frame may be reduced in size in comparison to the left side frame to which a handle is arranged, to thereby enhance the holdability of the reel. FIG. 40 shows a modification of the third embodiment shown in FIG. 15, in which the right side frame 101' and thus the right side plate 103 are reduced in the longitudinal length in comparison to the left side frame 101. In connection to this arrangement, the rear edge 101$a^E$ of the rear support plate 101a is curved upwardly rightward in FIG. 40, and further the rightward portion 101$a^R$ of the rear support plate 101a is decreased in height in comparison to the leftward portion 101$a^L$ to form the stepped upper surface 101$a^U$ which can receive, in a stable manner, the proximal portion of the thumb of the angler's hand grasping the right side plate 103 as shown in FIG. 41. Since the angler's right hand grasping the side plate 103 is positioned slightly rearwardly in comparison to that in the embodiment shown in FIG. 15, the thumb operation portion 108a of the switch-over element 108 is also located slightly rearwardly, so that the tip of the thumb of the angler's hand grasping the right side plate 103 is ergonomically received on the operation portion 108a. In this modification, the operation portion 108a is located between the spool shaft of the spool 111 and the handle shaft of the handle 117 in the plan view. In addition, a notched portion 500 is formed in the left side plate 102 and left side frame 101 to make the operation portion 108a flush with the outer peripheries of the left side plate 102 and left side frame 101.

What is claimed is:

1. A double bearing type fishing reel, comprising:

a spool arranged between first and second side plates of a reel main body and rotatable about a first axis for receiving a fishline around said spool, said fishline being delivered from said spool in a fishline play-out direction, said first side plate defining first and second ends, said first end being a first farthest point of said first side plate from said first axis in said fishline play-out direction, and said second end being a second farthest point of said first side plate from said first axis in a direction opposite to said fishline play-out direction;

a handle arranged on said first side plate and rotatable about a second axis, said handle being linked with said spool to rotate said spool to wind said fishline around said spool, and said second axis is located within a space defined longitudinally between said first axis and said second end; and a fishline parallel winding device for winding said fishline uniformly around said spool, wherein said fishline parallel winding device has a drive element which converts a rotational motion input from said handle into a reciprocating motion and wherein said drive element is substantially located between said first and second side plates.

2. A double bearing type fishing reel according to claim 1, wherein a drive gear is concentrically arranged on a handle shaft of said handle, meshes with a pinion fitted on a spool shaft of said spool, and is located entirely within said space.

3. A double bearing type fishing reel according to claim 1, wherein an adjusting knob is concentrically arranged with respect to said spool and is in pressure-contact with an end of a spool shaft of said spool and wherein said adjusting knob is exposed from said reel main body for manual rotation.

4. A double bearing type fishing reel according to claim 1, wherein said fishline parallel winding device is linked with said spool through gear means installed on said second side plate.

5. A double bearing type fishing reel according to claim 1, further comprising:

a clutch device for disconnecting said spool from said handle, said clutch device having a manual operation portion exposed from said reel main body, said manual operation portion being located above an outer periphery of said first side plate and longitudinally between said first axis and said first end for ergonomically receiving thereon a thumb of an angler's hand grasping said second side plate.

6. A double bearing type fishing reel according to claim 1, wherein said second side plate is formed with a pair of inclined grooves for ergonomically receiving index and middle fingers of an angler's hand grasping said second side plate.

7. A double bearing type fishing reel according to claim 1, wherein said second side plate has a ring portion into which an index finger of an anger's hand grasping said second side plate is insertable.

8. A double bearing type fishing reel according to claim 1, wherein said fishline parallel winding device further comprises:
 a fishline guide member which guides said fishline and is located remotely from said first axis in said fishline play-out direction; and
 an operation element coupling said drive element to said fishline guide member for moving said fishline guide member in response to said rotational motions
 wherein said drive element is located between said first axis and said second end.

9. A double bearing type fishing reel according to claim 8, wherein said operation element is pivotably arranged on said reel main body.

10. A double bearing type fishing reel according to claim 8, wherein said fishline guide member is slidably supported on a guide rod extending between said first and second side plates.

11. A double bearing type fishing reel according to claim 8, wherein said fishline guide member includes a first end portion connected to said operation element and a second end portion opposite from said first end portion and slidably supported by said reel main body.

12. A double bearing type fishing reel according to claim 8, wherein said drive element comprises:
 a traverse shaft which is disposed between said first and second side plates and which converts said rotational motion input from said handle into said reciprocating motion; and
 a drive element member which is coupled to said traverse shaft and follows said reciprocating motion,
 wherein said operation element is coupled to said drive element member.

13. A double bearing type fishing reel according to claim 1, further comprising:
 a fishline parallel winding device for uniformly winding said fishline around said spool, said fishline parallel winding device being linked with said handle through gear means installed on said first side plate.

14. A double bearing type fishing reel according to claim 1, further comprising:
 a clutch device for disconnecting said spool from said handle, said clutch device having a manual operation portion exposed from said reel main body, said manual operation portion being located above an outer periphery of said first side plate and longitudinally between said first axis and said first end.

15. A double bearing type fishing reel according to claim 14, wherein said manual operation portion is located so as to ergonomically receive a thumb of an angler's hand grasping said second side plate and wherein said second side plate is formed with a pair of inclined grooves for ergonomically receiving index and middle fingers of said angler's hand grasping said second side plate.

16. A double bearing type fishing reel according to claim 15, wherein said second side plate has a ring portion into which an index finger of said anger's hand grasping said second side plate is insertable.

17. A double bearing type fishing reel according to claim 1, further comprising:
 a fishline parallel winding device for uniformly winding said fishline around said spool, said winding device having a fishline guide member located within a space defined longitudinally between said first axis and said first end.

18. A double bearing type fishing reel which comprises:
 a reel main body having two side plates;
 a spool, supported rotatably between said two side plates, for taking up a fishline;
 a handle rotatably mounted on one of said two side plates, wherein said spool rotates in response to a rotation of said handle, wherein said handle is rotatably mounted on a first portion of said one of said side plates, said first portion is situated on a rear side of a spool shaft supporting said spool, and said rear side is situated opposite to a fishline play-out direction; and
 a fishline parallel winding device for winding said fishline uniformly around said spool, wherein said fishline parallel winding device has a drive element which converts a rotational motion input from said handle into a reciprocating motion and wherein said drive element is substantially located between said two side plates.

19. A double bearing type fishing reel according to claim 18,
 wherein said fishline parallel winding device is linked with said spool through gear means installed on said first side plate.

20. A double bearing type fishing reel which comprises:
 a reel body having two side plates;
 a spool rotatably supported between said two side plates; and
 a clutch mechanism for switching said spool between a fishline take-up state and a fishline play-out state;
 a handle for rotating said spool in a take-up direction, wherein said handle is provided on a first side plate of said side plates,
 a switch-over element shiftably disposed on an upper portion of said first side plate,
 wherein said switch-over element is situated on a fishline play-out direction side of said reel body and is situated in front of a handle shaft on which said handle is mounted,
 wherein said switch-over element forms at least part of said clutch mechanism and causes said clutch mechanism to switch said spool between said fishline take-up state and said fishline play-out state,
 wherein said switch-over element is shiftably disposed at a position where a switching operation of said switch-over element is adapted to be performed with a thumb of one hand while holding said reel in said one hand,
 wherein said spool is rotatable supported by a spool shaft disposed between said two side plates, and
 wherein said spool shaft is situated in front of said handle shaft on said fishline play-out direction side.

21. A double bearing type fishing reel according to claim 20,
 wherein said switch-over element switches said spool from said fishline take-up state to said fishline play-out state when said switch-over element switches from a first position to a second position, and wherein said switch-over element switches said spool from said fishline play-out state to said fishline take-up state when said switch-over element switches from said second position to said first position.

22. A fishing reel of a double bearing type as set forth in claim 20, wherein said position where said switching operation of said switch-over element is adapted to be performed with said thumb is located at said upper portion of said first side plate, is situated on said fishline play-out direction side of said reel body, and is situated in front of said handle shaft.

23. A fishing reel of a double bearing type as set forth in claim 22, wherein substantially all of said switch-over element is disposed on said first side plate.

24. A fishing reel of a double bearing type as set forth in claim 23, wherein substantially all of said switch-over element is disposed in front of said handle shaft on said fishline play-out direction side of said reel body.

25. A fishing reel of a double bearing type as set forth in claim 24, wherein substantially all of said switch-over element is disposed in front of said spool shaft on said fishline play-out direction side of said reel body and wherein said spool is rotatably disposed on said spool shaft.

26. A fishing reel of a double bearing type as set forth in claim 20, wherein substantially all of said switch-over element is disposed on said first side plate.

27. A fishing reel of a double bearing type as set forth in claim 20, wherein substantially all of said switch-over element is disposed in front of said handle shaft on said fishline play-out direction side of said reel body.

28. A fishing reel of a double bearing type as set forth in claim 20, wherein substantially all of said switch-over element is disposed in front of said spool shaft on said fishline play-out direction side of said reel body and wherein said spool is rotatably disposed on said spool shaft.

29. A fishline parallel winding device for winding a fishline uniformly around a spool supported rotatably between two side plates of a reel main body, said fishline parallel winding device comprising:

a drive element interposed between said side plates, disposed on a side of said spool which is opposite to a fishline play-out side, and is adapted to reciprocatingly move in response to a rotation of a handle; and an operation element supported on said reel main body and comprising a first portion and a second portion, wherein said first portion contains a fishline guide member for guiding said fishline to said spool and said second portion is connected to said drive element, wherein said fishline is wound around said spool via said operation element and fishline guide member due to a reciprocating motion of said drive element.

30. A fishline parallel winding device as set forth in claim 29, wherein a guide rod is interposed between said two side plates of said reel body for supporting said fishline guide member and for guiding said fishline guide member in such a manner that said fishline guide member reciprocates in parallel with said spool.

31. A fishline parallel winding device as set forth in claim 29, wherein said drive element includes an engaging member engageable and connectable with a traverse cam shaft which rotates in response to said handle and is supported by and between said two side plates and wherein said engaging member is arranged in such a manner that said engaging member faces said spool.

32. A fishline parallel winding device as set forth in claims 29, wherein said operation element has a central portion which is journaled on a back surface of a rod mounting portion of said reel main body and thus is adapted to be rotated about said central portion.

* * * * *